United States Patent
Tanaka et al.

(10) Patent No.: US 11,647,305 B2
(45) Date of Patent: May 9, 2023

(54) SOLID-STATE IMAGING APPARATUS, SIGNAL PROCESSING METHOD OF SOLID-STATE IMAGING APPARATUS AND ELECTRONIC DEVICE

(71) Applicant: SUPERBVUE SOLUTIONS INC., Zhuhai (CN)

(72) Inventors: Shunsuke Tanaka, Yokohama (JP); Yuki Nobusa, Yokohama (JP); Noboru Yamamoto, Yokohama (JP); Masaaki Tsuruta, Yokohama (JP)

(73) Assignee: SUPERBVUE SOLUTIONS, INC., Zhuhai (CN)

( * ) Notice: Subject to any disclaimer, the term of this patent is extended or adjusted under 35 U.S.C. 154(b) by 0 days.

(21) Appl. No.: 17/560,835

(22) Filed: Dec. 23, 2021

(65) Prior Publication Data

US 2022/0210354 A1 Jun. 30, 2022

(30) Foreign Application Priority Data

Dec. 24, 2020 (JP) .............................. JP2020-215183

(51) Int. Cl.
| | |
|---|---|
| *H04N 25/672* | (2023.01) |
| *H04N 25/61* | (2023.01) |
| *H04N 25/671* | (2023.01) |
| *H04N 23/84* | (2023.01) |

(Continued)

(52) U.S. Cl.
CPC ........... *H04N 25/672* (2023.01); *H04N 23/84* (2023.01); *H04N 25/61* (2023.01); *H04N 25/671* (2023.01); *H04N 25/134* (2023.01); *H04N 25/704* (2023.01)

(58) Field of Classification Search
CPC ...... H04N 23/84; H04N 23/843; H04N 23/88; H04N 25/134; H04N 25/61; H04N 25/611; H04N 25/671; H04N 25/672; H04N 25/704

See application file for complete search history.

(56) References Cited

U.S. PATENT DOCUMENTS

| | | | |
|---|---|---|---|
| 2015/0116566 A1* | 4/2015 | Yamamoto | H04N 25/672 348/308 |
| 2017/0171470 A1 | 6/2017 | Sakioka et al. | |
| 2021/0217134 A1* | 7/2021 | Okamura | H04N 23/843 |

FOREIGN PATENT DOCUMENTS

| | | |
|---|---|---|
| CN | 103650480 A | 3/2014 |
| CN | 105580352 A | 5/2016 |
| JP | 2001114075 A | 4/2001 |

(Continued)

*Primary Examiner* — Daniel M Pasiewicz
(74) *Attorney, Agent, or Firm* — Resonance IP Law, PC

(57) ABSTRACT

Disclosed are a solid-state imaging apparatus, a signal processing method of a solid-state imaging apparatus, and an electronic device, which are capable of correcting uneven sensitivities generated by multiple factors in a broad area and realizing the higher-precision image quality. A correction circuit 710 weight a sensitivity Pi corresponding to a pixel signal of each pixel related to correction in a pixel unit PU that is the correction target and a sensitivity Pi corresponding to a pixel signal of each pixel related to correction in at least one same color pixel unit PU and adjacent to the pixel unit PU that is the correction target by a weighting coefficient Wi. Consequently, the correction coefficient μ is calculated by dividing a sum of the weighted sensitivities by a total number n of pixels related to correction.

19 Claims, 23 Drawing Sheets

$$\mu = \frac{\sum_{i=1}^{4} 0.15 \times Pi + \sum_{i=5}^{20} 0.025 \times Pi}{20} \quad \text{Equation(2-1)}$$

(51) Int. Cl.
*H04N 25/13* (2023.01)
*H04N 25/704* (2023.01)

(56) References Cited

FOREIGN PATENT DOCUMENTS

| | | |
|---|---|---|
| JP | 2011029379 A | 2/2011 |
| JP | 2016052041 A | 4/2016 |

* cited by examiner

FIG. 3

$$\mu = \frac{\sum_{i=1}^{4} 0.111 \times Pi + \sum_{i=5}^{9} 0.056 \times Pi + \sum_{i=10}^{18} 0.0531 \times Pi}{18} \quad \text{Equation(2-3)}$$

$$\mu = \frac{\sum_{i=1}^{4} 5 \times Pi + \sum_{i=5}^{20} 3 \times Pi}{\sum_{i=1}^{4} 5 + \sum_{i=5}^{20} 3} = \frac{5 \sum_{i=1}^{4} Pi + 3 \sum_{i=5}^{20} Pi}{68} \quad \text{Equation(3-1)}$$

$$\mu = \frac{\sum_{i=1}^{4} 3 \times Pi + \sum_{i=5}^{8} 2 \times Pi}{\sum_{i=1}^{4} 3 + \sum_{i=5}^{8} 2} = \frac{3\sum_{i=1}^{4} Pi + 2\sum_{i=5}^{8} Pi}{20} \quad \text{Equation(3-2)}$$

Equation(4)

$$\mu = \frac{\sum_{i=1}^{n} f(i) \times Pi}{n}$$

- F(i)= a function showing a theoretical value of MCL shading
- n=16

Equation(5)

$$\mu = \frac{\sum_{i=1}^{n} f(i) \times w(i) \times Pi}{n}$$

- f(i)= a function showing a theoretical value of MCL shading
- w(i)= a correction coefficient determined by distances from target pixels
- n=80

SOLID-STATE IMAGING APPARATUS, SIGNAL PROCESSING METHOD OF SOLID-STATE IMAGING APPARATUS AND ELECTRONIC DEVICE

CROSS-REFERENCE TO RELATED APPLICATIONS

The present disclosure contains subject matter related to Japanese Patent Application JP 2020-215183 filed in the Japan Patent Office on Sep. 26, 2017, the entire contents of which being incorporated herein by reference.

BACKGROUND

1. Technical Field

The present disclosure relates to a solid-state imaging apparatus, a signal processing method of the solid-state imaging apparatus and an electronic device, and more particularly to a solid-state imaging apparatus, a signal processing method of the solid-state imaging apparatus and an electronic device that can be used for correcting pixel sensitivities.

2. Description of Related Art

Complementary metal oxide semiconductor (CMOS) sensors have been provided for practical use as solid-state imaging apparatus (e.g., image sensors). A solid-state imaging apparatus is a photoelectric conversion component that detects light and generates electric charges.

A CMOS image sensor generally uses three primary color filters (e.g., red (R), green (G) and blue (B)) or 4-color complementary color filters (e.g., cyan, magenta, yellow and green) to take color images.

Generally speaking, in a CMOS image sensor, a pixel is individually equipped with a color filter. The filter includes a red (R) filter that mainly transmits red light, a green (Gr, Gb) filter that mainly transmits green light and a blue (B) filter that mainly transmits blue light. Pixel units containing color filters are arranged squarely to form a pixel group. Multiple pixel groups are arranged in a two-dimensional manner to form a pixel portion (i.e., a pixel array). Such color filter arrangement is widely known as a Bayer pattern. In addition, for example, a microlens is configured to correspond each pixel. Moreover, a CMOS image sensor in which a plurality of pixels with the same color are arranged in a Bayer pattern has also been provided to achieve high sensitivity or high dynamic range (e.g., referring to Patent Documents 1 and 2).

Such a CMOS image sensor has been widely used as a part of an electronic device such as a digital camera, a video camera, a surveillance camera, a medical endoscope, a personal computer (PC), a mobile terminal apparatus (e.g., a mobile phone or a mobile device), etc.

Especially in recent years, the miniaturization and multi-pixelization of an image sensor mounted on a mobile terminal apparatus (e.g., a mobile phone or a mobile device) have continued to progress. The pixel size has also shrunk to a size of 1 μm and has gradually become the mainstream. In order to maintain the high resolution formed by the multiple pixels, the reduction of pixel pitch leads to a decrease in sensitivity or dynamic range. Generally, multiple adjacent pixels with the same color (e.g., 4 pixels) are arranged. When resolution is required, individual pixel signals are read. When high sensitivity or dynamic rang performance is required, the signals of pixels with the same color are added together for reading. Further, such a CMOS image sensor includes, for example, a plurality of pixels with the same color and adjacent to the pixel unit and sharing a microlens.

In a solid-state imaging apparatus (e.g., a CMOS image sensor) that includes a plurality of pixels sharing a microlens, the solid-state imaging apparatus can have distance information in the pixels, and has a phase detection auto focus (PDAF) function. On the other hand, in such a CMOS image sensor, since PDAF pixels are formed in the same color in the pixel array, the sensitivities of these PDAF pixels must be corrected in a normal shooting mode.

In order to perform the correction, for example, a correction method using the difference between averages of adjacent pixels with the same color has been provided (e.g., referring to Patent Documents 3 and 4).

CITATION LIST

Patent Literature

Patent Document 1: Japanese Patent Application Publication No. 1999-298800
Patent Document 2: Japanese Patent Application No. 5471117
Patent Document 3: Japanese Patent Application No. 6369233
Patent Document 4: U.S. Pat. No. 9,918,031 B2

SUMMARY

Problems to be Solved by the Present Disclosure

However, according to the correction method using the difference between averages of adjacent pixels with the same color as described in Patent Documents 3 and 4, since the range of pixels to be correction targets is limited to pixels with the same color in the same pixel unit, the correction methods thereof are also limited. Hence, it is difficult to correct uneven sensitivity generated by the color unevenness in a broader range or uneven sensitivity generated by multiple factors. Accordingly, the correction methods described in Patent Documents 3 and 4 using the difference between averages of adjacent pixels with the same color are further explained as follows.

FIG. 1 is a diagram showing an example of a pixel group formed as a pixel array of a solid-state imaging apparatus (a CMOS image sensor) as an RGB sensor using a correction method of the difference between averages of adjacent pixels with the same color.

The pixel group 1 in FIG. 1 is formed by a pixel unit PU1 with Gr pixels, a pixel unit PU2 with R pixels, a pixel unit PU3 with B pixels and a pixel unit PU4 with Gb pixels arranged in a Bayer pattern. The pixel unit PU1 is arranged with a plurality of adjacent pixels (e.g., 2×2=4) PXGrA, PXGrB, PXGrC and PXGrD with the same color (Gr). In the pixel unit PU1, a microlens MCL1 is configured to correspond to the 4 pixels PXGrA, PXGrB, PXGrC and PXGrD.

The pixel unit PU2 is arranged with a plurality of adjacent pixels (e.g., 2×2=4) PXRA, PXRB, PXRC and PXRD with the same color (R). In the pixel unit PU2, a microlens MCL2 is configured to correspond to the 4 pixels PXRA, PXRB, PXRC and PXRD. The pixel unit PU3 is arranged with a plurality of adjacent pixels (e.g., 2×2=4) PXBA, PXBB, PXBC and PXBD with the same color (B). In the pixel unit PU3, a microlens MCL3 is configured to correspond to the 4 pixels PXBA, PXBB, PXBC and PXBD. The pixel unit PU4 is arranged with a plurality of adjacent pixels (e.g., 2×2=4) PXGbA, PXGbB, PXGbC and PXGbD with the same color (Gb). In the pixel unit PU4, a microlens MCL4 is configured to correspond to the 4 pixels PXGbA, PXGbB, PXGbC and PXGbD.

For example, when the sensitivity of the pixel PXGrA in the Gr pixel of the pixel group 1 in FIG. 1 is to be corrected, the sensitivities of the 4 pixels PXGrA, PXGrB, PXGrC and PXGrD of the pixel unit PU1 are set to Pa to Pd, respectively, and the sensitivities of the 4 pixels PXGbA, PXGbB, PXGbC and PXGbD of the pixel unit PU4 adjacent to the pixel unit PU1 in the lower right direction is set to Pe to Ph, respectively. Accordingly, a correction coefficient Sa is given as the ratio of the sensitivity Pa to the average of the sensitivity of the pixel unit according to the following equation.

$$Sa=Pa/((Pa+Pb+Pc+Pd)/4) \quad \text{[Equation 1]}$$

As such, in the conventional correction method, the sensitivity is corrected by using the average of sensitivities of pixels with the same color in the same pixel unit. For example, when the sensitivities are uneven due to uneven localized sensitivities and other factors that extend to a broader range, the sensitivities Pe to Ph of adjacent Gb pixels PXGbA, PXGbB, PXGbC and PXGbD in FIG. 1 cannot be used as references for correction, for example. Consequently, the conventional correction method sometimes has insufficient sensitivity correction. For example, in order to correct the sensitivity, only the sensitivity of the pixel of the pixel unit is referred to, so that it is difficult to correct defects over a plurality of pixel units or pixel groups, such as strips.

In addition, as described above, in order to achieve miniaturization and thinning, camera modules of mobile terminal apparatus (e.g., mobile phones or mobile devices) need to be reduced in height. In order to respond to this demand, the angle of light incident on the periphery of the angle of view of the mounted image sensor tends to increase. If it is not possible to efficiently guide the obliquely incident light in the peripheral part of the angle of view to the photoelectric conversion region (photodiode), the sensitivity difference between the peripheral part of the angle of view and the central part of the angle of view becomes large, which is called shading. Deterioration of pixel characteristics may occur. However, in the conventional correction method, it is not possible to separately correct the sensitivity decrease due to monotonous shading that occurs toward the end of the lens and the variation of individual pixels, so accurate sensitivity correction is difficult.

The present disclosure provides a solid-state imaging apparatus, a signal processing method of the solid-state imaging apparatus and an electronic device which are capable of correcting uneven sensitivity generated by multiple factors in a broad area such that higher-precision image quality can be achieved. The present disclosure provides a solid-state imaging apparatus, a signal processing method of the solid-state imaging apparatus and an electronic device which are capable of correcting uneven sensitivity generated by multiple factors in a broad area, and can achieve higher-precision image quality, thereby more accurately correcting uneven sensitivity in a localized area.

Solutions to Solve Problems

According to a first embodiment of the present disclosure, a solid-state imaging apparatus includes: a pixel portion having a plurality of pixel units in which each of the pixel units includes a plurality of pixels of same color for performing photoelectric conversion; and a correction circuit that corrects a pixel sensitivity of the pixel units to be a correction target with reference to an obtained correction coefficient, wherein the correction circuit weighs a sensitivity value corresponding to a pixel signal of each of the pixels related to the correction in the pixel unit to be the correction target and the sensitivity value corresponding to a pixel signal of each of the pixels related to the correction in at least one of the pixel units adjacent to the pixel unit to be the correction target by weighting coefficients, and then obtains a weighted average of weighted sensitivities so as to obtain the correction coefficient.

According to a second embodiment of the present disclosure, a signal processing method of a solid-state imaging apparatus is provided. The solid-state imaging apparatus includes: a pixel portion having a plurality of pixel units in which each of the pixel units includes a plurality of pixels of same color for performing photoelectric conversion; and a correction circuit that corrects a pixel sensitivity of the pixel units to be a correction target with reference to an obtained correction coefficient, wherein the correction circuit weighs a sensitivity value corresponding to a pixel signal of each of the pixel related to the correction in the pixel unit to be the correction target and a sensitivity value corresponding to a pixel signal of each of the pixels related to the correction in at least one of the pixel units adjacent to the pixel unit to be the correction target by weighting coefficients, and then obtains a weighted average of weighted sensitivity values so as to obtain the correction coefficient.

According to a third embodiment of the present disclosure, an electronic device includes: a solid-state imaging apparatus; and an optical system configured for imaging an object in the solid-state imaging apparatus, wherein the solid-state imaging apparatus comprises: a pixel portion having a plurality of pixel units in which each of the pixel units includes a plurality of pixels of same color for performing photoelectric conversion; and a correction circuit that corrects a pixel sensitivity of the pixel units to be a correction target with reference to an obtained correction coefficient, wherein the correction circuit weighs a sensitivity value corresponding to a pixel signal of each of the pixels related to the correction in the pixel unit to be the correction target and a sensitivity value corresponding to a pixel signal of each of the pixels related to the correction in at least one of the pixel units adjacent to the pixel unit to be the correction target by weighting coefficients, and then obtains a weighted average of weighted sensitivities so as to obtain the correction coefficient.

Effects of the Present Disclosure

The present disclosure can correct uneven sensitivities generated by multiple factors in a broad area, and can achieve higher-precision image quality. In addition, the present disclosure can correct uneven sensitivities generated by various factors in a broad area, and can achieve higher-precision image quality, thereby more accurately correcting uneven sensitivities in a localized area.

BRIEF DESCRIPTION OF DRAWINGS

FIG. 3 is a diagram showing a formation example of a pixel array in a pixel portion according to the first embodiment of the present disclosure.

DETAILED DESCRIPTION

The embodiments of the present disclosure are related to the drawings for description hereinafter.

First Embodiment

Figure 1:
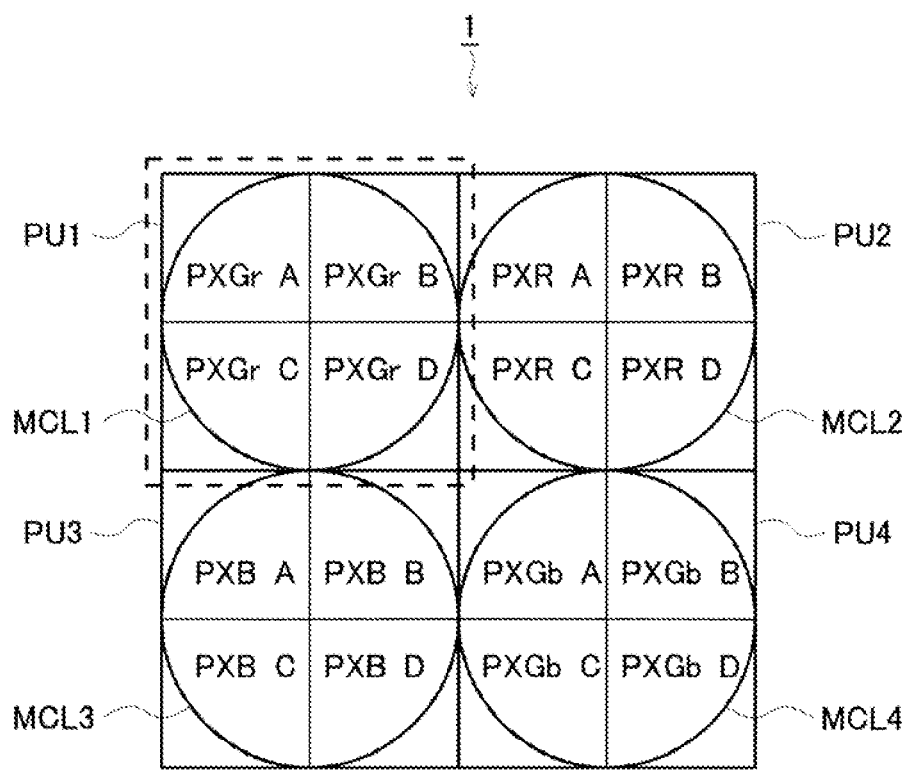
FIG. 1 is a diagram showing an example of a pixel group formed in a pixel array of a solid-state imaging apparatus (a CMOS image sensor) as an RGB sensor adopting a correction method of the difference between averages of adjacent pixels with the same color.
Figure 2:
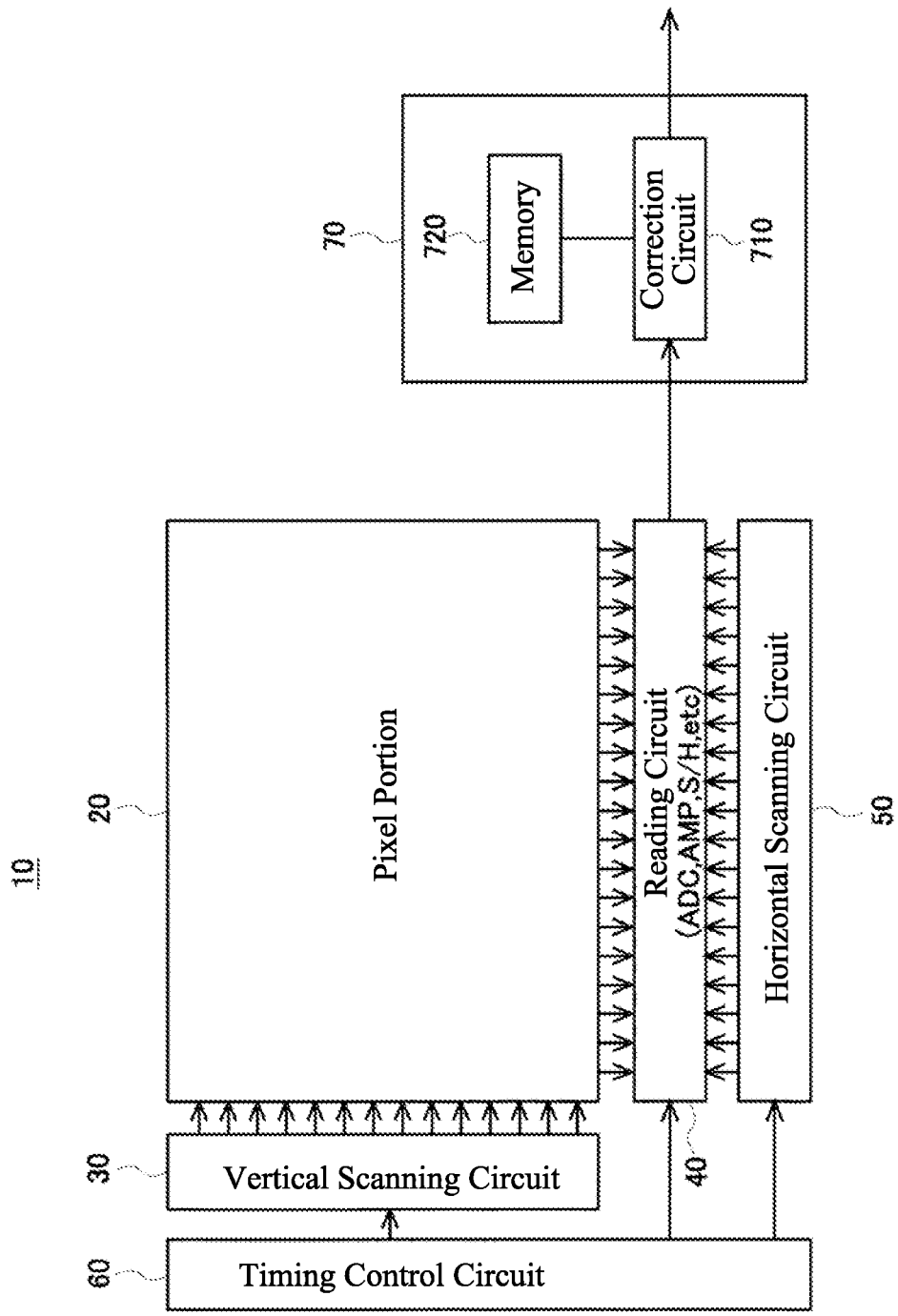
FIG. 2 is a block diagram showing a structure example of the solid-state imaging apparatus according to a first embodiment of the present disclosure.

FIG. 2 is a block diagram showing a structure example of a solid-state imaging apparatus according to a first embodiment of the present disclosure. According to the embodiment, the solid-state imaging apparatus is constituted by, for example, a CMOS image sensor.

As shown in FIG. 2, the solid-state imaging apparatus 10 mainly has a pixel portion 20 including a pixel array, a vertical scanning circuit (a row scanning circuit) 30, a reading circuit (a column reading circuit) 40, a horizontal scanning circuit (a column scanning circuit) 50, a timing control circuit 60 and a signal processing circuit 70.

In the first embodiment, as described in detail later, the solid-state imaging apparatus 10 is having a plurality of pixel units (PUs) in the pixel portion 20. The PU contains a plurality of pixels with the same color (PX) performing photoelectric conversion, and the signal processing circuit 70 has a correction circuit 710. The correction circuit 710 corrects the sensitivity of the pixel PX of the PU to be the correction target and that is correlated with an obtained correction coefficient $\mu$.

In the first embodiment, the correction circuit 710 weighs a sensitivity corresponding to a pixel signal of each pixel PX related to correction in the PU to be the correction target and a sensitivity corresponding to a pixel signal of each pixel related to correction in at least one same color PU adjacent to the PU to be the correction target by a weighting coefficient Wi. Accordingly, the correction coefficient $\mu$ is obtained by a weighted average of the weighted sensitivities obtained by weighting. In the first embodiment, the correction circuit 710 weighs a sensitivity corresponding to a pixel signal of each pixel PX related to correction in the PU to be the correction target and a sensitivity corresponding to a pixel signal of each pixel related to correction in at least one same color pixel unit PU adjacent to the PU to be the correction target by a weighting coefficient Wi. Consequently, the correction coefficient $\mu$ is obtained (calculated) by dividing a sum of the weighted sensitivities by a total number of pixels related to correction.

As such, the solid-state imaging apparatus 10 in the first embodiment is configured to be able to correct uneven sensitivities caused by multiple factors in a broad area, thereby achieving the higher-precision image quality.

Therefore, after describing the specific structures, arrangement, etc. of the pixel units including a plurality of pixels with the same color (in this example, 4 pixels with the same color) in the pixel portion 20 of the solid-state imaging apparatus 10 and the outline of the composition and function of each part, a method of correcting a pixel sensitivity will be described in detail later.

(Structure of the Pixel Array 200, the Pixel Group PXG and the Pixel Unit PU of the Pixel Portion 20)

Figure 3:
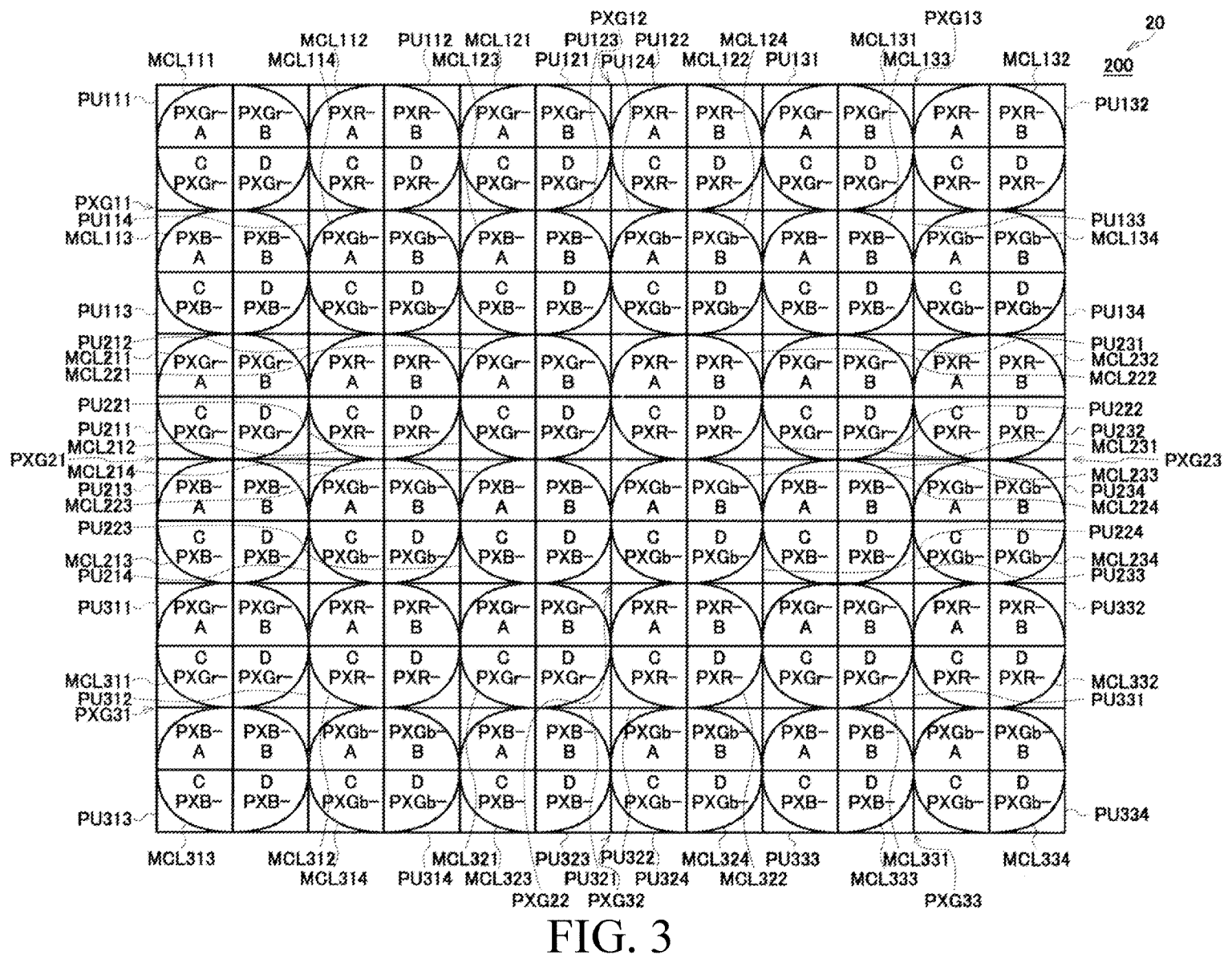
Figure 4:
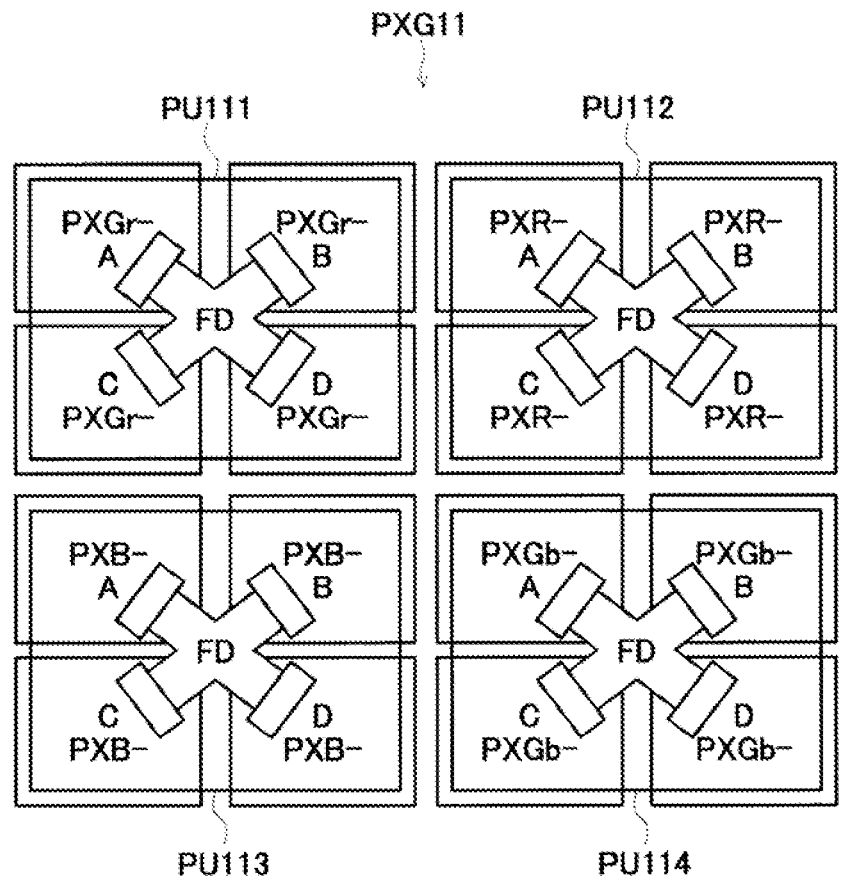
FIG. 4 is a diagram showing an example of pixel groups forming a pixel array according to the first embodiment of the present disclosure.

FIG. 3 is a diagram showing a formation example of a pixel array in a pixel portion according to the first embodiment of the present disclosure. FIG. 4 is a diagram showing an example of pixel groups forming a pixel array according to the first embodiment of the present disclosure.

In the pixel portion 20, a plurality of pixels PX including photodiodes (photoelectric conversion units) and a pixel amplifier are arranged in a two-dimensional matrix to form a pixel array 200.

The pixel PX is basically composed of photodiodes and a plurality of pixel transistors. The pixel transistors include, for example, a transfer transistor, a reset transistor, a source follower transistor with an amplification function and a select transistor. However, in the first embodiment, as shown in FIG. 4, a 4-pixel sharing structure in which 4 pixels with the same color in a pixel unit share a floating diffusion FD is adopted. Specifically, as described in detail later, the 4 pixels share the floating diffusion FD11, the reset transistor RST11-Tr, the source follower transistor SF11-Tr and the select transistor SEL11-Tr. In addition, for example, when correcting the sensitivity of an arbitrary pixel, the shared floating diffusion FD is used as an addition unit for the pixel signals read from the plurality of pixels of the same pixel unit PU to be referred to at the time of correction to produce an additive effect.

As described later, the pixel array 200 in the first embodiment forms adjacent plural pixels (4 pixels in the first embodiment) with the same color as m×m (m is an integer of two or more). In the first embodiment, a 2×2 square arrangement forms a pixel unit PU. Additionally, a pixel group PXG is formed by 4 adjacent pixel units PU, and a plurality of pixel groups PXG are arranged in a matrix. In the example in FIG. 3, in order to simplify the drawing, a pixel array 200 in which 9 pixel groups PXG11, PXG12, PXG13, PXG21, PXG22, PXG23, PXG31, PXG32 and PXG33 are arranged in a 3×3 matrix is shown.

(Structure of the Pixel Group PXG and the Pixel Unit PU)

As shown in FIGS. 3 and 4, the pixel group PXG11 is formed by a pixel unit PU111 with Gr pixels, a pixel unit PU112 with R pixels, a pixel unit PU113 with B pixels and a pixel unit PU114 with Gb pixels arranged in a Bayer pattern. The pixel group PXG 12 is formed by the pixel unit PU121 with Gr pixels, the pixel unit PU 122 with R pixels, the pixel unit PU 123 with B pixels and the pixel unit PU 124 with Gb pixels arranged in a Bayer pattern. The pixel group PXG 13 is formed by the pixel unit PU 131 with Gr pixels, the pixel unit PU 132 with R pixels, the pixel unit PU 133 with B pixels and the pixel unit PU 134 with Gb pixels arranged in a Bayer pattern.

The pixel group PGX21 is formed by the pixel unit PU211 with Gr pixels, the pixel unit PU212 with R pixels, the pixel unit PU213 with B pixels and the pixel unit PU214 with Gb pixels arranged in a Bayer pattern. The pixel group PGX22 is formed by the pixel unit PU221 with Gr pixels, the pixel unit PU222 with R pixels, the pixel unit PU223 with B pixels and the pixel unit PU224 with Gb pixels arranged in a Bayer pattern. The pixel group PGX23 is formed by the pixel unit PU231 with Gr pixels, the pixel unit PU232 with R pixels, the pixel unit PU233 with B pixels and the pixel unit PU234 with Gb pixels arranged in a Bayer pattern.

The pixel group PGX31 is formed by the pixel unit PU311 with Gr pixels, the pixel unit PU312 with R pixels, the pixel unit PU313 with B pixels and the pixel unit PU314 with Gb pixels arranged in a Bayer pattern. The pixel group PGX32 is formed by the pixel unit PU321 with Gr pixels, the pixel unit PU322 with R pixels, the pixel unit PU323 with B pixels and the pixel unit PU324 with Gb pixels arranged in a Bayer pattern. The pixel group PGX33 is formed by the pixel unit PU331 with Gr pixels, the pixel unit PU332 with R pixels, the pixel unit PU333 with B pixels and the pixel unit PU334 with Gb pixels arranged in a Bayer pattern.

As a result, the pixel groups PXG11, PXG12, PXG13, PXG21, PXG22, PXG23, PXG31, PXG32 and PXG33 have the same structure and are arranged in a matrix in a repetitive manner. The pixel units constituting a pixel group also have the same structure as a pixel group. Therefore, the pixel units PU111, PU112, PU113 and PU114 forming the pixel group PXG11 are described here as a representative example.

The pixel unit PU111 is configured with a plurality of adjacent 4 pixels PXGr-A, PXGr-B, PXGr-C and PXGr-D with the same color (Gr), for example, 2×2 pixels. In the pixel unit PU111, a microlens MCL111 is configured to correspond to 4 pixels PXGr-A, PXGr-B, PXGr-C and PXGr-D.

The pixel unit PU112 is configured with a plurality of adjacent 4 pixels PXR-A, PXR-B, PXR-C and PXR-D with the same color (R), for example, 2×2 pixels. In the pixel unit PU112, a microlens MCL111 is configured to correspond to 4 pixels PXR-A, PXR-B, PXR-C and PXR-D.

The pixel unit PU113 is configured with a plurality of adjacent 4 pixels PXB-A, PXB-B, PXB-C and PXB-D with the same color (B), for example, 2×2 pixels. In the pixel unit PU113, a microlens MCL113 is configured to correspond to 4 pixels PXB-A, PXB-B, PXB-C and PXB-D.

The pixel unit PU114 is configured with a plurality of adjacent 4 pixels PXGb-A, PXGb-B, PXGb-C and PXGb-D with the same color (Gb), for example, 2×2 pixels. In the pixel unit PU114, a microlens MCL114 is configured corresponding to 4 pixels PXGb-A, PXGb-B, PXGb-C and PXGb-D.

The other pixel groups PXG12, PXG13, PXG21, PXG22, PXG23, PXG31, PXG32 and PXG33 also have the same structure as the above-mentioned pixel group PXG11.

Moreover, as described in detail later, in the first embodiment, the correction circuit 710 weighs a sensitivity corresponding to a pixel signal of each pixel PX related to correction in the PU to be the correction target and a sensitivity corresponding to a pixel signal of each pixel related to correction in at least one same color PU adjacent to the PU to be the correction target by a weighting coefficient Wi. Accordingly, the correction coefficient $\mu$ is obtained by a weighted average of the weighted sensitivities obtained by weighting. As described in detail later, the correction coefficient $\mu$ is obtained by dividing the weighted sensitivities by a total number of pixels related to correction. In addition, in association with the pixel array of FIG. 3, a description is given of a plurality of examples of at least one same color (Gr or Gb) pixel unit (PU) adjacent to the pixel unit (PU) of the Gr or Gb pixels that is the correction target.

For example, when it is necessary to correct the sensitivity (or color difference signal level) of any one of the 4 Gb pixels of the pixel unit PU114 of the pixel group PXG11, the 4 Gb pixels of the pixel unit PU114 are adjacent to the pixel units with the same color as that of the pixel unit PU114 to be the correction target, that is, the pixel unit PU111 on the upper left side, the pixel unit PU121 on the upper right side, the pixel unit PU211 on the lower left side and the pixel unit PU221 on the lower right side are relative to the pixel unit PU114 to be the correction target. Basically, the correction refers to the read value of each pixel PX (the sensitivity corresponding to the pixel signal) of the pixel unit PU114 containing the pixels that are the correction targets, and also refers to the read value of each pixel (the sensitivity corresponding to the pixel signal) of at least one of the pixel units PU111, PU121, PU211 and PU221.

When it is necessary to correct the sensitivity (or color difference signal level) of any one of the 4 Gb pixels of the pixel unit PU124 of the pixel group PXG12, the 4 Gb pixels of the pixel unit PU124 are adjacent to the pixel units with the same color as that of the pixel unit PU124 to be the correction target, that is, the pixel unit PU121 on the upper left side, the pixel unit PU131 on the upper right side, the pixel unit PU221 on the lower left side and the pixel unit PU231 on the lower right side are relative to the pixel unit PU124 to be the correction target. Basically, the correction refers to the read value of each pixel PX (the sensitivity corresponding to the pixel signal) of the pixel unit PU214 containing the pixels that are the correction targets, and also refers to the read value of each pixel (the sensitivity corresponding to the pixel signal) of at least one of the pixel units PU121, PU131, PU231 and PU231.

When it is necessary to correct the sensitivity (or color difference signal level) of any one of the 4 Gr pixels of the pixel unit PU221 of the pixel group PXG22, the 4 Gr pixels of the pixel unit PU221 are adjacent to the pixel units with the same color as that of the pixel unit PU221 to be the correction target, that is, the pixel unit PU114 on the upper left side, the pixel unit PU124 on the upper right side, the pixel unit PU214 on the lower left side and the pixel unit PU224 on the lower right side are relative to the pixel unit PU221 to be the correction target. Basically, the correction refers to the read value of each pixel PX (the sensitivity corresponding to the pixel signal) of the pixel unit PU221 containing the pixel that is the correction target, and also refers to the read value of each pixel (the sensitivity corresponding to the pixel signal) of at least one of the pixel units PU114, PU124, PU214 and PU224.

When it is necessary to correct the sensitivity (or color difference signal level) of any one of the 4 Gr pixels of the pixel unit PU231 of the pixel group PXG23, the 4 Gb pixels of the pixel unit PU231 are adjacent to the pixel units with the same color as that of the pixel unit PU231 to be the correction target, that is, the pixel unit PU124 on the upper left side, the pixel unit PU134 on the upper right side, the pixel unit PU224 on the lower left side and the pixel unit PU234 on the lower right side are relative to the pixel unit PU221 to be the correction target. Basically, the correction refers to the read value of each pixel PX (the sensitivity corresponding to the pixel signal) of the pixel unit PU231 containing the pixels that are the correction targets, and also refers to the read value of each pixel (the sensitivity corresponding to the pixel signal) of at least one of the pixel units PU124, PU134, PU224 and PU234.

When it is necessary to correct the sensitivity (or color difference signal level) of any one of the 4 Gb pixels of the pixel unit PU214 of the pixel group PXG21, the 4 Gb pixels of the pixel unit PU214 are adjacent to the pixel units with the same color as that of the pixel unit PU214 to be the correction target, that is, the pixel unit PU211 on the upper left side, the pixel unit PU221 on the upper right side, the pixel unit PU311 on the lower left side and the pixel unit PU321 on the lower right side are relative to the pixel unit PU214 to be the correction target. Basically, the correction refers to the read value of each pixel PX (the sensitivity corresponding to the pixel signal) of the pixel unit PU214 containing the pixels that are the correction targets, and also refers to the read value of each pixel (the sensitivity corresponding to the pixel signal) of at least one of the pixel units PU211, PU221, PU311 and PU321.

When it is necessary to correct the sensitivity (or color difference signal level) of any one of the 4 Gb pixels of the pixel unit PU224 of the pixel group PXG22, the 4 Gb pixels of the pixel unit PU224 are adjacent to the pixel units with the same color as that of the pixel unit PU224 to be the correction target, that is, the pixel unit PU221 on the upper left side, the pixel unit PU231 on the upper right side, the pixel unit PU321 on the lower left side and the pixel unit PU331 on the lower right side are relative to the pixel unit PU224 to be the correction target. Basically, the correction refers to the read value of each pixel PX (the sensitivity corresponding to the pixel signal) of the pixel unit PU224 containing the pixels that are the correction targets, and also refers to the read value of each pixel (the sensitivity corresponding to the pixel signal) of at least one of the pixel units PU221, PU231, PU321 and PU331.

When it is necessary to correct the sensitivity (or color difference signal level) of any one of the 4 Gr pixels of the pixel unit PU321 of the pixel group PXG32, the 4 Gb pixels of the pixel unit PU321 are adjacent to the pixel units with the same color as that of the pixel unit PU321 to be the correction target, that is, the pixel unit PU214 on the upper left side, the pixel unit PU224 on the upper right side, the pixel unit PU314 on the lower left side and the pixel unit PU324 on the lower right side are relative to the pixel unit PU321 to be the correction target. Basically, the correction refers to the read value of each pixel PX (the sensitivity corresponding to the pixel signal) of the pixel unit PU321 containing the pixels that are the correction targets, and also refers to the read value of each pixel (the sensitivity corresponding to the pixel signal) of at least one of the pixel units PU214, PU224, PU314 and PU324.

When it is necessary to correct the sensitivity (or color difference signal level) of any one of the 4 Gr pixels of the pixel unit PU331 of the pixel group PXG33, the 4 Gb pixels of the pixel unit PU331 are adjacent to the pixel units with the same color as that of the pixel unit PU331 to be the correction target, that is, the pixel unit PU224 on the upper left side, the pixel unit PU234 on the upper right side, the pixel unit PU324 on the lower left side and the pixel unit PU334 on the lower right side are relative to the pixel unit PU331 to be the correction target. Basically, the correction refers to the read value of each pixel PX (the sensitivity corresponding to the pixel signal) of the pixel unit PU321 containing the pixels that are the correction targets, and also refers to the read value of each pixel (the sensitivity corresponding to the pixel signal) of at least one of the pixel units PU324, PU234, PU324 and PU334.

As described above, in the first embodiment, as shown in FIG. 4, a 4-pixel sharing structure in which 4 pixels with the same color in a pixel unit share a floating diffusion FD is adopted. Hence, a structure example in which 4 pixels with the same color in a pixel unit share a floating diffusion FD is described as follows.

(Structure Example of Sharing 4 Pixels of the Pixel Unit)

Figure 5:
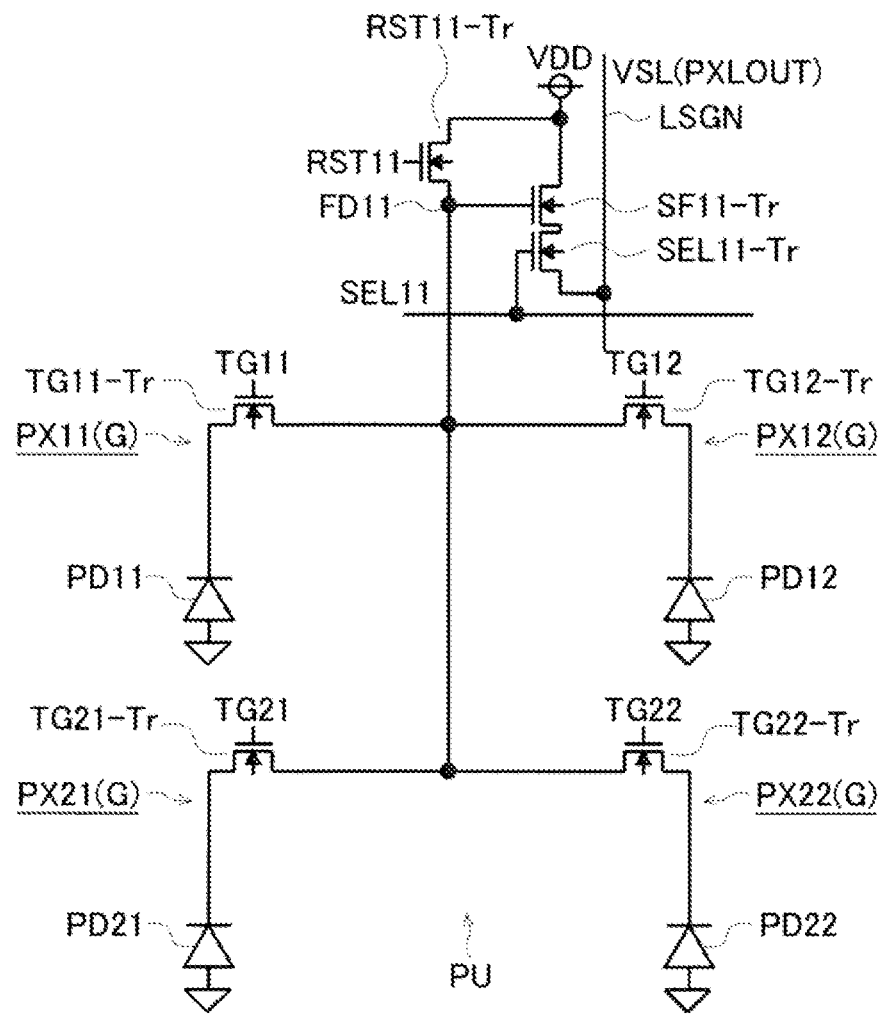
FIG. 5 is a circuit diagram showing an example of a pixel unit in which 4 pixels of a pixel group of a solid-state imaging apparatus share a floating diffusion according to the first embodiment of the present disclosure.

FIG. 5 is a circuit diagram showing an example of a pixel unit in which 4 pixels of a pixel group of a solid-state imaging apparatus share a floating diffusion according to the first embodiment of the present disclosure.

In the pixel portion 20 of FIG. 5, the pixel unit PU of the pixel group PXG consists of 4 pixels (color pixels in the embodiment, G pixels herein), that is, a first color pixel PX11, a second color pixel PX12, a third color pixel PX21 and a fourth color pixel PX22 are arranged in a 2×2 square.

The first color pixel PX11 is composed of a photodiode PD11 formed by a first photoelectric conversion region and a transfer transistor TG11-Tr.

The second color pixel PX12 is composed of a photodiode PD12 formed by the second photoelectric conversion region and a transfer transistor TG12-Tr.

The third color pixel PX13 is composed of a photodiode PD21 formed by the third photoelectric conversion region and a transfer transistor TG21-Tr.

The fourth color pixel PX22 is composed of a photodiode PD22 and a transfer transistor TG22-Tr.

In addition, the pixel group PXG formed by the pixel units PU includes 4 color pixels PX11, PX12, PX21 and PX22 sharing the floating diffusion FD11, a reset transistor RST11-Tr, a source follower transistor SF11-Tr and a select transistor SEL11-Tr.

In the 4-pixel sharing structure, for example, the first color pixel PX11, the second color pixel PX12, the third color pixel PX21 and the fourth color pixel PX22 are formed in the same color to form G (Gr, Gb (green)) pixels. For example, the photodiode PD11 of the first color pixel PX11 functions as a first green (G) photoelectric conversion unit. The photodiode PD12 of the second color pixel PX12 functions as a second green (G) photoelectric conversion unit. The photodiode PD21 of the third color pixel PX21 functions as a third green (G) photoelectric conversion unit. The photodiode PD22 of the fourth color pixel PX22 functions as a fourth green (G) photoelectric conversion unit.

For the photodiodes PD11, PD12, PD21 and PD22, for example, embedded photodiodes (PPD) are used. Since there are surface levels caused by defects such as dangling bonds on the surface of the substrate on which the photodiodes PD11, PD12, PD21 and PD22 are formed, a lot of charges (dark current) are generated due to thermal energy such that correct signals cannot be read. In an embedded photodiode (PPD), by embedding the charge storage part of the photodiode PD in the substrate, it is possible to reduce dark current mixed into a signal.

The photodiodes PD11, PD12, PD21 and PD22 generate and accumulate signal charges (electrons herein) corresponding to the amount of incident light. In the following, description are made on the case where the signal charges are electrons and each transistor is an n-type transistor. However, if the signal charges are holes, each transistor is a p-type transistor.

The transfer transistor TG11-Tr is connected between the photodiode PD11 and the floating diffusion FD11, and the "on" state is controlled by the control signal TG11. Since the transfer transistor TG11-Tr is under the control of the reading control system, the control signal TG11 makes the transfer transistor TG11-Tr in the "on" state during the predetermined high level (H) such that the photodiode PD11 undergoes photoelectric conversion and the accumulated charges (electrons) are transferred to the floating diffusion FD11.

The transfer transistor TG12-Tr is connected between the photodiode PD12 and the floating diffusion FD11, and the "on" state is controlled by the control signal TG12. Since the transfer transistor TG12-Tr is under the control of the reading control system, the control signal TG12 makes the transfer transistor TG12-Tr in the "on" state during the predetermined high level (H) such that the photodiode PD12 undergoes photoelectric conversion and the accumulated charges (electrons) are transferred to the floating diffusion FD11.

The transfer transistor TG21-Tr is connected between the photodiode PD21 and the floating diffusion FD11, and the "on" state is controlled by the control signal TG21. Since the transfer transistor TG21-Tr is under the control of the reading control system, the control signal TG21 makes the transfer transistor TG21-Tr in the "on" state during the predetermined high level (H) such that the photodiode PD21 undergoes photoelectric conversion and the accumulated charges (electrons) are transferred to the floating diffusion FD11.

The transfer transistor TG22-Tr is connected between the photodiode PD22 and the floating diffusion FD11, and the "on" state is controlled by the control signal TG22. Since the transfer transistor TG22-Tr is under the control of the reading control system, the control signal TG22 makes the transfer transistor TG22-Tr in the "on" state during the predetermined high level (H) such that the photodiode PD22 undergoes photoelectric conversion and the accumulated charges (electrons) are transferred to the floating diffusion FD11.

As shown in FIG. 5, the reset transistor RST11-Tr is connected between the power line VDD (or power supply potential) and the floating diffusion FD11, and the "on" state is controlled by the control signal RST11. Since the reset transistor RST11-Tr is under the control of the reading control system, the control signal RST11 makes the reset transistor RST11-Tr in the "on" state during the high level H and the floating diffusion FD11 is reset to the potential of the power line VDD (or VRst).

The source follower transistor SF11-Tr and the select transistor SEL11-Tr are connected in series between the power line VDD and the vertical signal line LSGN. The gate of the source follower transistor SF11-Tr is connected to the floating diffusion FD11, and the "on" state of the select transistor SEL11-Tr is controlled by the control signal SEL11. The control signal SEL11 makes the select transistor SEL11-Tr in the "on" state during the high level H. Hence, the source follower transistor SF11-Tr converts the charges of the floating diffusion FD11 into a voltage signal by means of the gain of the charge amount (potential) such that the column output read voltage (signal) VSL (PXLOUT) is outputted to the vertical signal line LSGN.

In such configuration, when the transfer transistor TG11-Tr of the pixel PX11, the transfer transistor TG12-Tr of the pixel PX12, the transfer transistor TG21-Tr of the pixel PX21 and the transfer transistor TG22-Tr of the pixel PX22 are individually turned on and off, the photodiodes PD11, PD12, PD21 and PD22 undergo photoelectric conversion, and the accumulated charges are sequentially transferred to the common floating diffusion FD11, the pixel signal VSL of the pixel unit is sent to the vertical signal line LSGN, and inputted to the column reading circuit 40. In the embodiment, the camera mode is called a pixel independent mode.

On the other hand, when the transfer transistor TG11-Tr of the pixel PX11, the transfer transistor TG12-Tr of the pixel PX12, the transfer transistor TG21-Tr of the pixel PX21 and the transfer transistor TG22-Tr of the pixel PX22 are turned on and off at the same time (or the transfer transistors TG12-Tr, TG21-Tr and TG22-Tr are individually turned on and off), the photodiodes PD11, PD12, PD21 and PD22 undergo photoelectric conversion, and the accumulated charges are simultaneously transferred to the common floating diffusion FD11 such that the floating diffusion FD11 functions as an addition unit. At this time, a sum signal obtained by summing a plurality of pixel signals of 2, 3 or 4 pixels in the pixel unit is sent to the vertical signal line LSGN, and inputted to the column reading circuit 40. In the embodiment, the imaging mode is called a pixel addition operation mode.

The vertical scanning circuit 30 drives the pixels in the shutter row and the reading row through row scanning control lines according to the control of the timing control circuit 60. In addition, the vertical scanning circuit 30 outputs the row select signal for the row address of the read row for reading the signal and the shutter row for resetting the charges accumulated in the photodiode PD according to the address signal.

In a normal pixel reading operating, shutter scanning is performed by driving of the vertical scanning circuit 30 of the reading control system, and then reading scanning is performed.

The reading circuit 40 may also be configured to include a plurality of column signal processing circuits (not shown) corresponding to the column outputs of the pixel portions 20, and perform column parallel processing by the plurality of column signal processing circuits.

The reading circuit 40 may include a correlated double sampling (CDS) circuit or an analog-digital converter (ADC), an amplifier (AMP) and a sample hole (S/H) circuit.

The horizontal scanning circuit 50 scans the signals processed by a plurality of column signal processing circuits such as the ADC of the reading circuit 40, transmits the signals in a horizontal direction, and outputs the signals to the signal processing circuit 70.

The timing control circuit 60 generates timing signals required for signal processing such as the pixel portion 20, the vertical scanning circuit 30, the reading circuit 40 and the horizontal scanning circuit 50.

The signal processing circuit 70 may also have the function of generating a two-dimensional image through predetermined signal processing. The signal processing circuit 70 at least includes a correction circuit 710 and memory 720, performs sensitivity difference correction processing such as correcting the sensitivity difference of each pixel, and outputs the processed pixel signal to the subsequent image signal processor (ISP). Additionally, the correction circuit 710 may be disposed inside a CMOS image sensor chip, and may also be disposed outside thereof.

The correction circuit 710 has a function of performing sensitivity difference correction procession for correcting the sensitivity difference of each pixel based on the weighting coefficient Wi stored in the memory 720, for example. The correction circuit 710 executes (calculates) a required correction coefficient μ when performing sensitivity difference correction processing, and the correction coefficient stored in the memory 720 is processed.

The memory 720 stores the correction coefficient μ processed and obtained by the correction circuit 710, and supplies it to the correction circuit 710 as necessary.

The following is for the correction processing of the correction circuit 710. The correction coefficient acquisition processing that calculates and acquires the correction coefficient μ applied to the sensitivity difference correction processing is the core, and are described in relation to specific examples.

(Correction Coefficient Acquisition Processing of the Correction Circuit 710) In the first embodiment, the correction circuit 710 corrects sensitivities of the pixels of the pixel unit PU to be the correction target in a manner related to the correction coefficient μ obtained (calculated) by Equation 2.

$$\mu = \frac{\sum_{i=1}^{n} Wi \times Pi}{n} \quad \text{[Equation 2]}$$

$$\sum_{i=1}^{n} Wi = 1$$

wherein μ is a correction coefficient,
Wi is a weighting factor (a constant),
Pi is a sensitivity of each pixel, and
n is a total number of pixels related to correction.

The correction circuit 710 weighs a sensitivity Pn corresponding to a pixel signal of each pixel related to correction in the pixel unit PU to be the correction target and a sensitivity Pn corresponding to a pixel signal of each pixel related to correction in at least one pixel unit PU adjacent to the pixel unit PU to be the correction target by a weighting coefficient Wi. Consequently, the correction coefficient μ is obtained by a weighted average of the weighted sensitivities obtained by weighting.

In the first embodiment, the correction coefficient μ is calculated by dividing a sum of the weighted sensitivities by a total number of pixels related to correction. That is, the correction circuit 710 weighs a sensitivity Pn corresponding to a pixel signal of each pixel PX related to correction in the PU to be the correction target and a sensitivity corresponding to a pixel signal of each pixel related to correction in at least one same color pixel unit PU adjacent to the PU to be the correction target by a weighting coefficient Wi. Consequently, the correction coefficient μ is obtained (calculated) by dividing a sum of the weighted sensitivities by a total number of pixels related to correction. In addition, in the first embodiment, as described later, the correction circuit 710 divides a sum of the sensitivities Pn obtained by a weighted average by the number of pixels of the pixel units related to correction, not by the total number n of pixels related to correction to obtain a correction coefficient μ.

Figure 6:
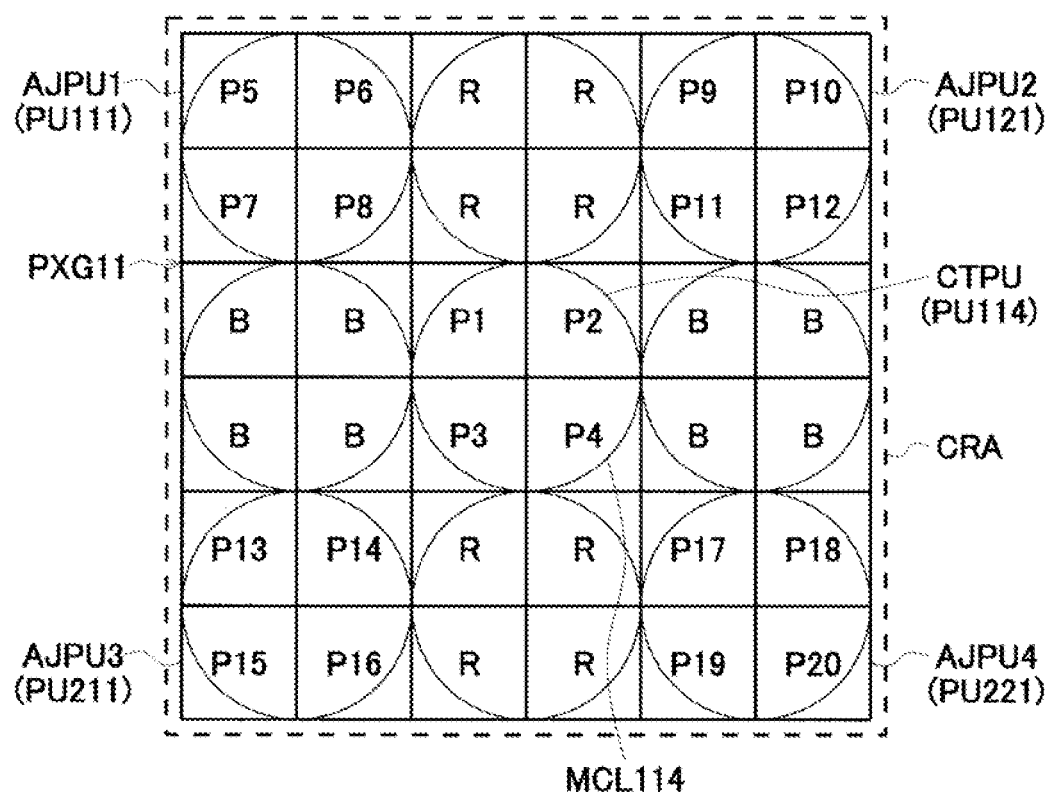
FIG. 6 is a diagram showing an example of a correction-related region on a pixel array including a correction target pixel unit for which the correction circuit according to the first embodiment of the present disclosure acquires a correction coefficient and an adjacent pixel unit adjacent to the correction target pixel unit.

FIG. 6 is a diagram showing that a correction circuit obtains a correction coefficient of a corrected pixel unit and including an example of corrected related areas adjacent to the corrected pixel unit on the pixel array according to the first embodiment of the present disclosure.

Here, for example, the pixel unit PU114 of the pixel group PXG11 shown in FIG. 3 is a correction target pixel unit CTPU. 1, 2, 3 or 4 pixel units are selected from the pixel unit PU111 on the upper left side, the pixel unit PU121 on the upper right side, the pixel unit PU211 on the lower left side and the pixel unit PU221 on the lower right side are relative to the pixel unit PU114 to be the correction target, and used as adjacent pixel units AJPU1 to AJPU4. In addition, the sensitivities of the read values of 4 pixels of the correction target pixel unit CTPU is represented by P1, P2, P3 and P4. The sensitivities of the 4-pixel adjacent pixel unit AJPU1 is represented by P5, P6, P7 and P8. The sensitivities of the 4-pixel adjacent pixel unit AJPU2 is represented by P9, P10, P11 and P12. The sensitivities of the 4-pixel adjacent pixel unit AJPU3 is represented by P13, P14, P15 and P16. The sensitivities of the 4-pixel adjacent pixel unit AJPU4 is represented by P17, P18, P19 and P20. Moreover, the 9 pixel units of 3×3 shown in FIG. 6 are used to define a correction related area CRA.

Herein, three specific examples of the correction coefficient acquisition processing in the first embodiment are described as follows.
(First Specific Example of the Correction Coefficient Acquisition Processing in the First Embodiment)

Figure 7:
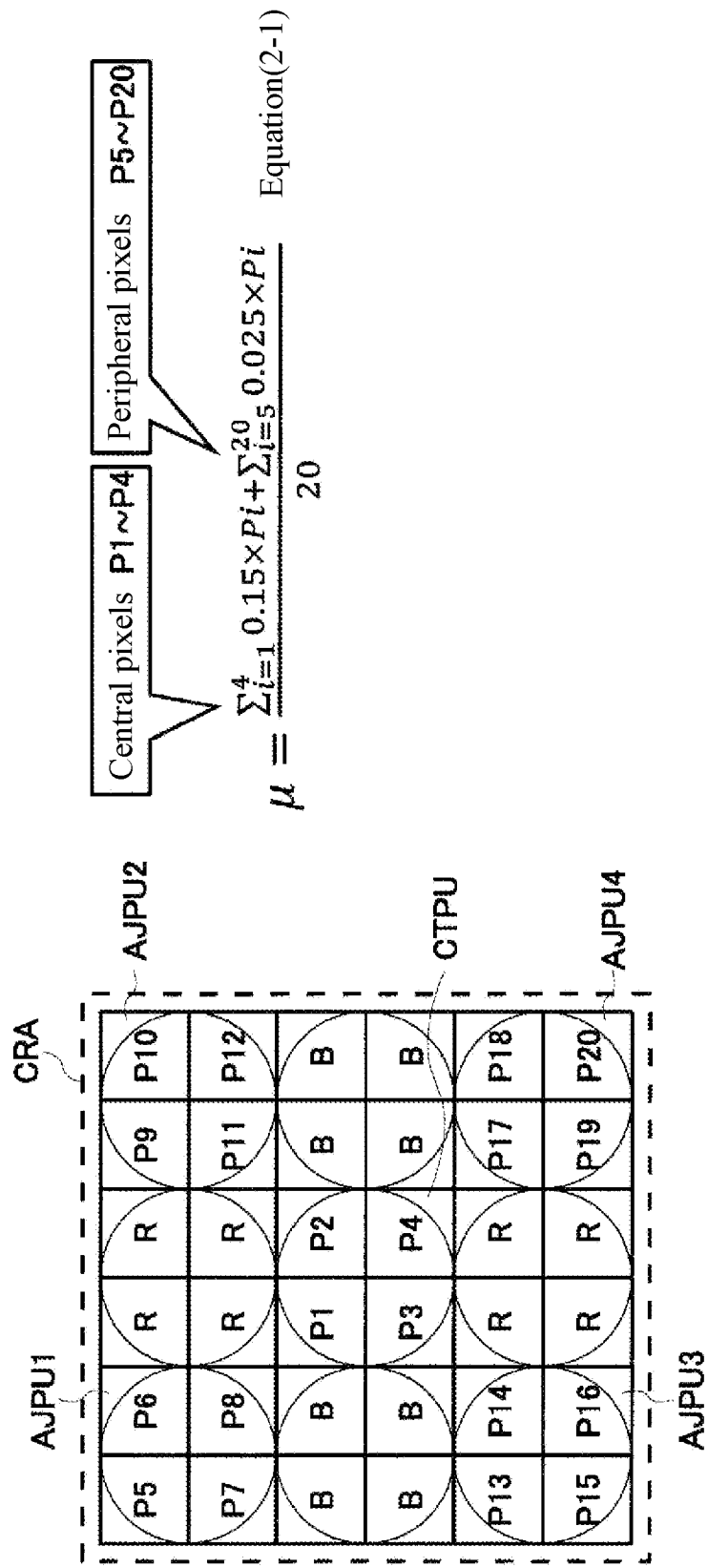
FIG. 7 is a diagram for explaining a first specific example of a processing for obtaining a correction coefficient according to the first embodiment of the present disclosure.

FIG. 7 is a diagram showing a first specific example of obtaining a correction coefficient according to the first embodiment of the present disclosure. In addition, Equation 2-1 shows an example of substituting the first weighting coefficient CTW1 and the second weighting coefficient AJW1 into specific numerical values as the weighting coefficient of the above-mentioned Equation 2.

$$\mu = \frac{\sum_{i=1}^{4} 0.15 \times Pi + \sum_{i=5}^{20} 0.025 \times Pi}{20} \quad \text{[Equation 2-1]}$$

In the first specific example, the pixel unit PU114 is equivalent to the correction target pixel unit CTPU, and uses the pixel unit PU111 on the upper left side, the pixel unit PU121 on the upper right side, the pixel unit PU211 on the lower left side and the pixel unit PU221 on the lower right side are relative to the pixel unit PU114 to be the correction target as adjacent pixel units AJPU1 to AJPU4.

The correction refers to the read value of each pixel PX (sensitivities P1 to P4 corresponding to the pixel signals) of the correction target pixel unit CTPU, which contains the correction target pixels, and also refers to the read value of each pixel of the adjacent pixel unit AJPU1 (sensitivities P5 to P8 corresponding to the pixel signals), the read value of each pixel of the adjacent pixel unit AJPU2 (sensitivities P9 to P12 corresponding to the pixel signals), the read value of each pixel of the adjacent pixel unit AJPU3 (sensitivities P13 to P16 corresponding to the pixel signals) and the read value of each pixel of the adjacent pixel unit AJPU4 (sensitivities P17 to P20 corresponding to the pixel signals).

Further, as shown in Equation 2-1, as for the weighting coefficient W, the first weighting coefficient CTW1 of the pixels of the correction target pixel unit CTPU (PU114) is set to "0.15," and the second weighting coefficient AJW1 of the pixels adjacent to the pixel units AJPU1 to AJPU4 is set to "0.025." Such setting values satisfy the above-mentioned condition CTW>AJW. Additionally, "0.15" of the first weighting coefficient CTW1 is set to correspond to the sensitivities P1 to P4 of the 4 pixels of the correction target pixel unit CTPU, and "0.025" of the second weighting coefficient AJW1 is set to correspond to the 16 pixels of the adjacent pixel units AJPU1 to AJPU4. As a result, the sum of the weighting coefficients W becomes (0.15×4+0.025×16)=1, which satisfies the condition of Equation 2. Besides, in this example, the total number n of pixels that are the correction targets becomes "20."

As such, in the first specific example, the correction circuit 710 obtains (calculates) the correction coefficient μ used to correct the sensitivity P1 of the correction target pixel at the upper left of the correction target pixel unit CTPU, and obtains the sensitivities P1 to P4 for the four G pixels arranged in the correction target pixel unit CTPU which is the same as the correction target pixel (G pixel) and multiplied by the first weighting coefficient CTW1 (0.15) such that the first sum of the sensitivities is obtained by weighting. At the same time, the correction circuit 710 obtains the sensitivities P5 to P20 for the sixteen G pixels of the adjacent pixel units AJPU1 to AJPU4 arranged diagonally above the correction target pixel unit CTPU and multiplied by the second weighting coefficient AJW1 (0.025) such that the second sum of the sensitivities is obtained by weighting. Moreover, the first sum of and the second sum of the weighted sensitivities are added to obtain a weighted total sensitivity, and the weighted total sensitivity is divided by the total number n(=20) of pixels related to correction to obtain a desired correction coefficient μt.

Accordingly, the pixel array 200 adjacent to the pixel unit containing a plurality of pixels with the same color like G pixels does not use a simple average, but uses not only the correction target pixel unit CTPU, but also the weighted average of the adjacent pixel units AJPUs adjacent to the correction target pixel unit CTPU. For example, it is possible to correct the uneven sensitivity generated by multiple factors under a microlens, thereby achieving the higher-precision image quality.

Besides, in the first embodiment, each weighting coefficient Wi is specified by a constant, and the sum thereof become a constant. In the example, the weighting coefficients are set such that the sum of the weighting coefficients Wi becomes 1. That is, the more adjacent pixel units related to correction are (i.e., the more the pixels related to correction are), the smaller the second weighting coefficient AJW1 is. The less adjacent pixel units related to corrections are (i.e., the less the pixels related to correction are), the larger the second weighting coefficient AJW2 is.

As a result, it is less affected by the number of adjacent pixel units (the number of pixels related to correction) related to correction, and it is possible to stably obtain a highly accurate correction coefficient μ with less unevenness regardless of the sampling area.

(Second Specific Example of the Correction Coefficient Acquisition Processing in the First Embodiment)

Figure 8:
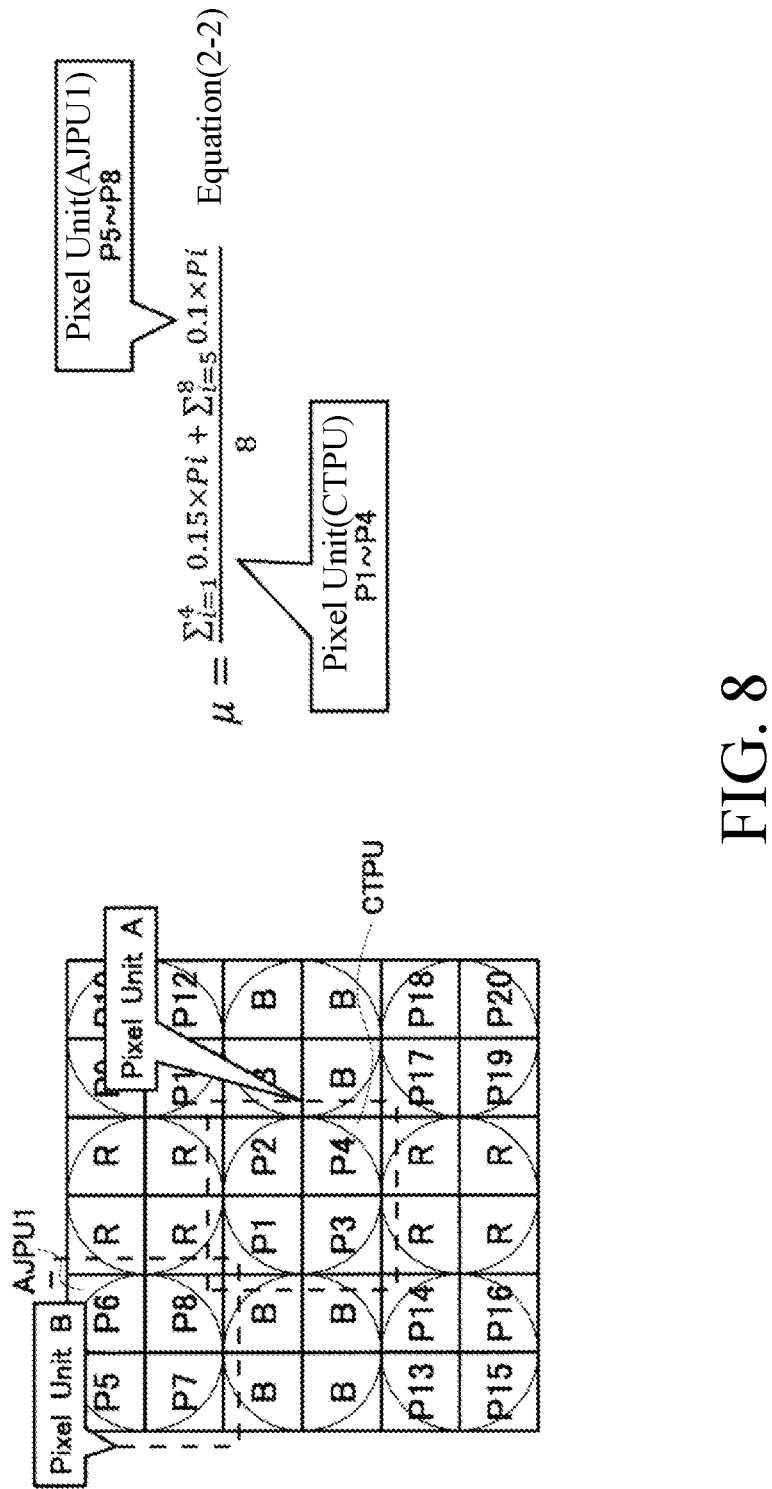
FIG. 8 is a diagram for explaining a second specific example of a processing for obtaining a correction coefficient according to the first embodiment of the present disclosure.

FIG. 8 is a diagram showing a second specific example of obtaining a correction coefficient according to the first embodiment of the present disclosure. In addition, Equation 2-2 shows an example of substituting the first weighting coefficient CTW1 and the second weighting coefficient AJW1 into specific numerical values as the weighting coefficient of the above-mentioned Equation 2.

$$\mu = \frac{\sum_{i=1}^{4} 0.15 \times Pi + \sum_{i=5}^{8} 0.01 \times Pi}{8} \qquad \text{[Equation 2-2]}$$

In the second specific example, the pixel unit PU114 is equivalent to the correction target pixel unit CTPU, and uses the pixel unit PU111 on the upper left side with respect to the correction target pixel unit CTPU as an adjacent pixel unit AJPU1 with the same color. In addition, in the example, 1, 2, 3 or 4 pixel units are selected from the pixel unit PU111 on the upper left side, the pixel unit PU121 on the upper right side, the pixel unit PU211 on the lower left side and the pixel unit PU221 on the lower right side are relative to the pixel unit PU114 to be the correction target, and used as adjacent pixel units AJPU1 to AJPU4.

The correction refers to the read value of each pixel PX (sensitivities P1 to P4 corresponding to the pixel signals) of the correction target pixel unit CTPU, which contains the correction target pixels, and also refers to the read value of each pixel of the adjacent pixel unit AJPU1 (sensitivities P5 to P8 corresponding to the pixel signals).

Further, as shown in Equation 2-2, as for the weighting coefficient W, the first weighting coefficient CTW1 of the pixels of the correction target pixel unit CTPU (PU114) is set to "0.15", and the second weighting coefficient AJW1 of the pixels adjacent to the pixel unit AJPU1 is set to "0.1." Such setting value satisfies the above-mentioned condition CTW>AJW. Additionally, "0.15" of the first weighting coefficient CTW1 is set to correspond to the sensitivities P1 to P4 of the 4 pixels of the correction target pixel unit CTPU, and "0.1" of the second weighting coefficient AJW1 is set to correspond to the 4 pixels of the adjacent pixel unit AJPU1. As a result, the sum of the weighting coefficients W becomes (0.15×4+0.1×4)=1, which satisfies the condition of Equation 2. Besides, in this example, the total number n of pixels that are the correction targets becomes "8."

As such, in the second specific example, the correction circuit 710 obtains (calculates) the correction coefficient μ used to correct the sensitivity P1 of the correction target pixel at the upper left of the correction target pixel unit CTPU, and obtains the sensitivities P1 to P4 for the four G pixels arranged in the correction target pixel unit CTPU which is the same as the correction target pixel (G pixel) and multiplied by the first weighting coefficient CTW1 (0.15) such that the first sum of the sensitivities is obtained by weighting. At the same time, the correction circuit 710 obtains the sensitivities P5 to P8 for the four G pixels of the adjacent pixel unit AJPU1 arranged diagonally above the correction target pixel unit CTPU and multiplied by the second weighting coefficient AJW1 (0.1) such that the second sum of the sensitivities is obtained by weighting. Moreover, the first sum of and the second sum of the weighted sensitivities are added to obtain a weighted total sensitivity, and the weighted total sensitivity is divided by the total number n(=8) of pixels related to correction to obtain a desired correction coefficient µ.

Accordingly, the pixel array 200 adjacent to the pixel unit containing a plurality of pixels with the same color like G pixels does not use a simple average, but uses not only the correction target pixel unit CTPU, but also the weighted average of the adjacent pixel units AJPUs adjacent to the correction target pixel unit CTPU. For example, it is possible to correct the uneven sensitivity generated by multiple factors under a microlens, thereby achieving the higher-precision image quality.

(Third Specific Example of the Correction Coefficient Acquisition Processing in the First Embodiment)

Figure 9:
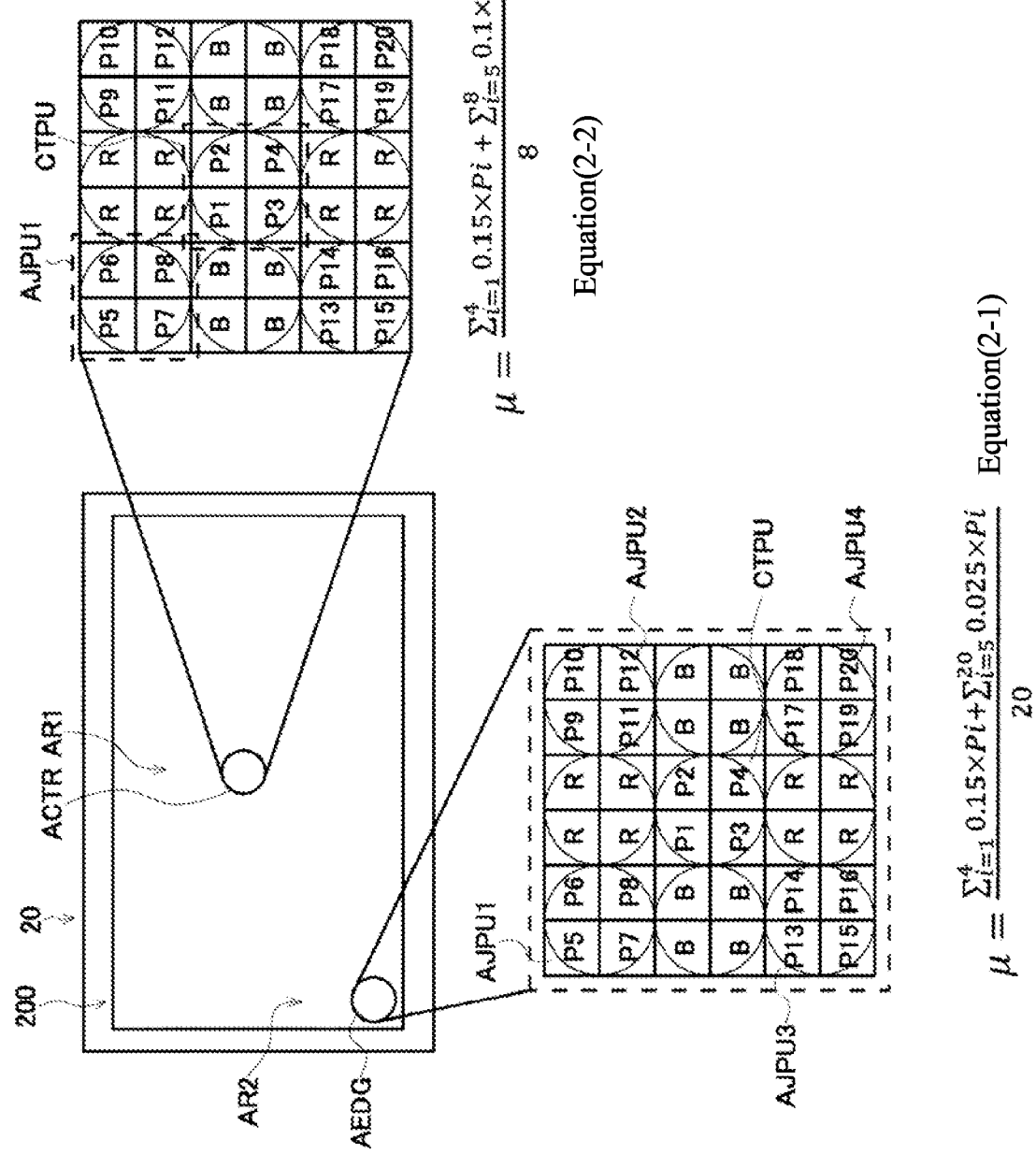
FIG. 9 is a diagram for explaining a third specific example of a processing for obtaining correction coefficients according to the first embodiment of the present disclosure.

FIG. 9 is a diagram showing a third specific example of obtaining correction coefficients according to the first embodiment of the present disclosure.

In the third specific example, the correction circuit 710 may use different numbers of adjacent pixel units AJPU for correction according to the arrangement areas of pixels in the pixel portion 20. In the example, the first arrangement area AR1 and the second arrangement area AR2 are adopted as arrangement areas of pixels. The first arrangement area AR1 includes the central area ACTR of the pixel portion 20, and the second arrangement area AR2 includes the peripheral area AEDG of the pixel portion 20.

The correction circuit 710 may use fewer adjacent pixel units AJPUs in the first arrangement area AR1, and then divide a sum of the weighted sensitivities according to Equation 2-2 by the first total number of pixels related to correction (8 in the example of FIG. 9) to calculate the correction coefficient µ. The correction circuit 710 increases the number of adjacent pixel units AJPUs used in the second arrangement area AR2 to improve accuracy, and then divide a sum of the weighted sensitivities according to Equation 2-1 by the first total number of pixels related to correction (20 in the example of FIG. 9) to calculate the correction coefficient µ.

According to the correction method, it is easy to change the corrected sampling area or correction coefficient according to arrangement positions of the pixels in the pixel portion 20. For example, in FIG. 9, in the central area ACTR of the pixel portion 20 of the image sensor, the correction coefficient µ for correcting the sensitivity is obtained by Equation 2-2. Besides, for example, Equation 2-1 can also be used in the chip peripheral area AEDG where the incidence of oblique light is more and the influence of shading is greater such that a wider range of adjacent pixels can be corrected.

To sum up, in the first embodiment, the correction circuit 710 weighs a sensitivity Pn corresponding to a pixel signal of each pixel PX related to correction in the PU to be the correction target and a sensitivity Pn corresponding to a pixel signal of each pixel related to correction in at least one same color PU adjacent to the PU to be the correction target by a weighting coefficient Wi. Accordingly, the correction coefficient µ is calculated by dividing a sum of the weighted sensitivities by a total number of pixels related to correction.

Therefore, the first embodiment has the advantages of being able to correct uneven sensitivity generated by multiple factors in a broad area and to achieve the higher-precision image quality.

In addition, according to the first embodiment, the correction circuit 710 can use different numbers of adjacent pixel units AJPUs for correction based on the arrangement areas of pixels in the pixel portion 20. Hence, the first embodiment can individually correct uneven sensitivity generated by multiple factors in a broad area with the best correction method, and can achieve the higher-precision image quality, thereby being able to correct uneven sensitivity in a local area with high accuracy.

Second Embodiment

Figure 10:
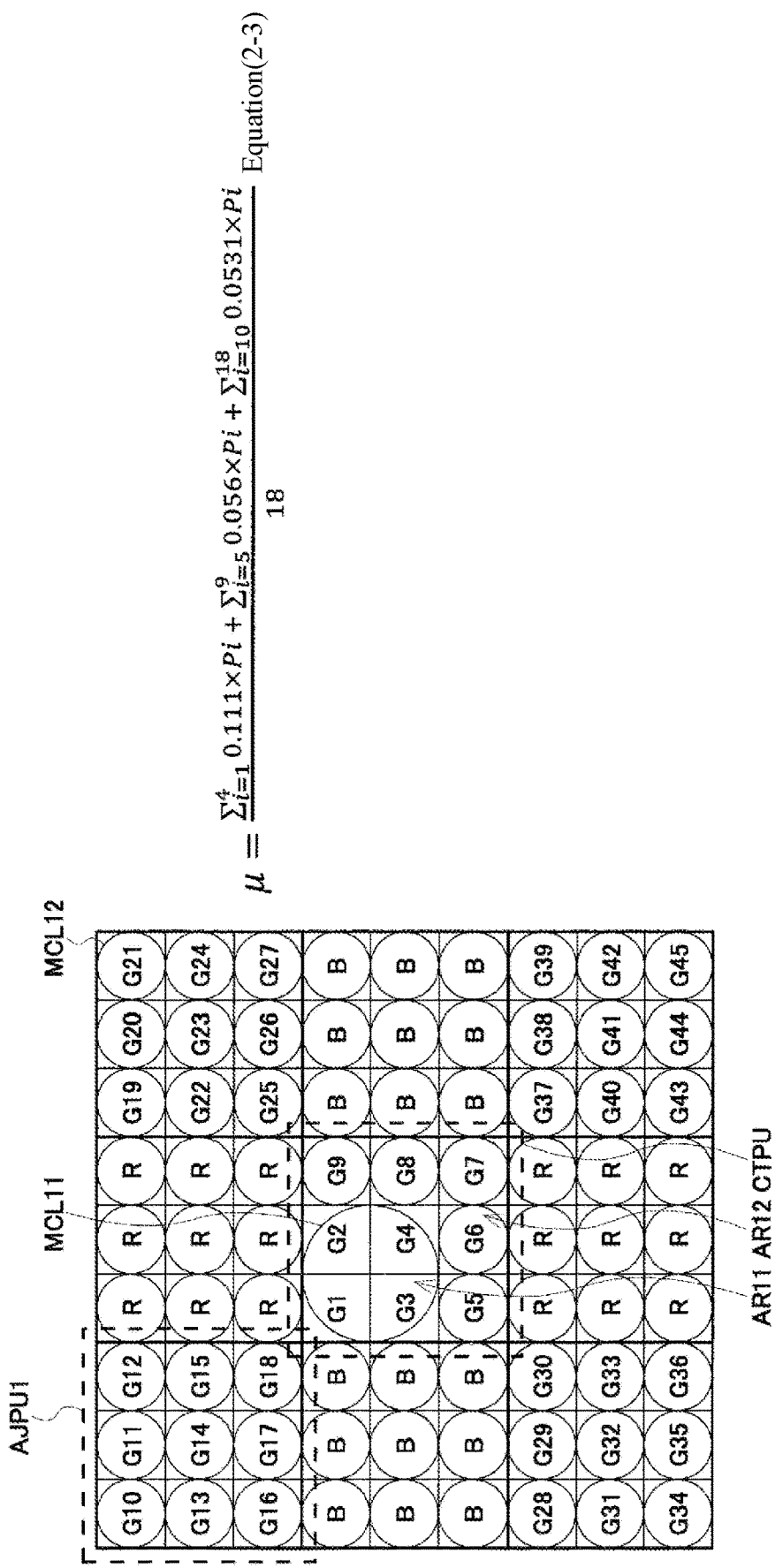
FIG. 10 is a diagram for explaining a processing for obtaining correction coefficients according to a second embodiment of the present disclosure.

FIG. 10 is a diagram showing that a correction coefficient is obtained according to a second embodiment of the present disclosure. In addition, Equation 2-3 shows an example of substituting the first weighting coefficient CTW1 and the second weighting coefficient AJW1 into specific numerical values as the weighting coefficient of the above-mentioned Equation 2.

$$\mu = \frac{\sum_{i=1}^{4} 0.011 \times Pi + \sum_{i=5}^{9} 0.056 \times Pi + \sum_{i=10}^{18} 0.0531 \times Pi}{18}$$ [Equation 2-3]

The differences between the second and the first embodiment are described as follows. In the first embodiment, each pixel unit PU is composed of 4 pixels (G) with the same color of 2×2, a microlens MCL is configured to correspond to all 4 pixels of each pixel unit PU.

In contrast, in the second embodiment, each pixel unit PU is composed of 9 pixels with the same color (G) of 3×3, and a microlens MCL is configured to correspond to the 4 pixels G1 to G4 at the upper left of the correction target pixel unit CTPU to have a PDAF function. Besides, each microlens MCL is configured to correspond to each pixel of the remaining pixels G5 to G9 of the correction target pixel unit CTPU, the pixels G10 to G45 of the adjacent pixel units AJPU1 to AJPU4 and the B pixels adjacent to the left and right of the CTPU and the R pixels adjacent to the top and bottom of the CTPU.

Moreover, in the second embodiment, the correction target pixel unit CTPU is divided into a first area AR11 where the correction target pixels G1 to G4 are configured and a second area where the remaining pixels G5 to G9 are configured. The first weighting coefficient CTW1 is set for the first area AR11, and the second weighting coefficient AJW2 is set for the second area AR12 to obtain a sum of the weighted sensitivities in each area. Subsequently, the correction coefficient µ is obtained by dividing a sum of the weighted sensitivities of the adjacent pixel unit AJPU 1 by the total number n of pixels related to correction.

Further, as shown in Equation 2-3, as for the weighting coefficient W, the first weighting coefficient CTW1 of the pixels of the first area AR11 of the correction target pixel unit CTPU (PU114) is set to "0.111," the second weighting coefficient AJW2 of the pixels of the second area AR12 is set to "0.056," and the second weighting coefficient AJW1 of the pixels of the adjacent pixel unit AJPU1 is set to "0.0531." Such setting values satisfy the above-mentioned condition CTW>AJW2>AJW1. Additionally, "0.111" of the first weighting coefficient CTW1 is set to correspond to the sensitivities P1 to P4 of the 4 pixels G1 to G4 of the correction target pixel unit CTPU, "0.056" of the second weighting coefficient AJW2 is set to correspond to the 5 pixels G5 to G9 of the correction target pixel unit CTPU, and "0.0531" of the second weighting coefficient AJW1 is set to correspond to the 9 pixels G10 to G18 of the adjacent pixel unit AJPU1. As a result, the sum of the weighting coefficients W becomes (0.111×4+0.056×5+0.0531 x 9)=1, which satisfies the condition of Equation 2. Besides, in the example, the total number n of pixels that are the correction targets becomes "18."

To sum up, in the second embodiment, in the pixel arrangement adjacent to 3×3 pixels with the same color, in order to correct the sensitivities of the pixels G1 to G4 with the same microlens in the correction target pixel unit CTPU located in the center, the pixels G5 to G9 located in the same pixel unit CTPU are multiplied by the coefficient μ of the adjacent pixel unit AJPU for weighting to correct the sensitivities. In other words, in the embodiment, the first weighting coefficient CTW1 of the target area configured with the pixels that are the correction targets is set to a maximum value, and the second weighting coefficient AJW used in other pixel arrangement areas is set to a value that meets the arrangement condition of the target area.

As such, by weighting and summing the influence of the distance or structure from the correction target pixel on sensitivity, it is possible to perform a more precise sensitivity correction than a simple sum of the average values.

Third Embodiment

Equation 3 (shown below) is a calculation for obtaining the correction coefficient in the correction coefficient acquisition processing of the third embodiment of the present disclosure.

$$\mu = \frac{\sum_{i=1}^{n} Wi \times Pi}{\sum_{i=1}^{n} Wi}$$ [Equation 3]

wherein μ is a correction coefficient,
Wi is a weighting factor (a constant), and
Pi is a sensitivity of each pixel.

The differences between the correction coefficient of the third embodiment and the correction coefficient of the first embodiment are described as follows.

In the correction coefficient acquisition processing of the first embodiment, the correction circuit 710 weighs a sensitivity Pn corresponding to a pixel signal of each pixel related to correction in the pixel unit PU to be the correction target and a sensitivity Pn corresponding to a pixel signal of each pixel related to correction in at least one same color pixel unit PU adjacent to the pixel unit PU to be the correction target by a weighting coefficient Wi. Accordingly, the correction coefficient μ is calculated by dividing a sum of the weighted sensitivities by a total number n of pixels related to correction.

In contrast, in the correction coefficient acquisition processing of the third embodiment, the correction circuit 710 weighs a sensitivity Pn corresponding to a pixel signal of each pixel PX related to correction in the PU to be the correction target and a sensitivity Pn corresponding to a pixel signal of each pixel related to correction in at least one same color pixel unit PU adjacent to the PU to be the correction target by a weighting coefficient Wi. Consequently, the correction coefficient μ is calculated by dividing a sum of the weighted sensitivities by a sum of the weighting coefficients of the pixel units related to correction.

Here, three specific examples of the correction coefficient acquisition processing in the third embodiment are described as follows.

(First Specific Example of the Correction Coefficient Acquisition Processing in the Third Embodiment)

Figure 11:
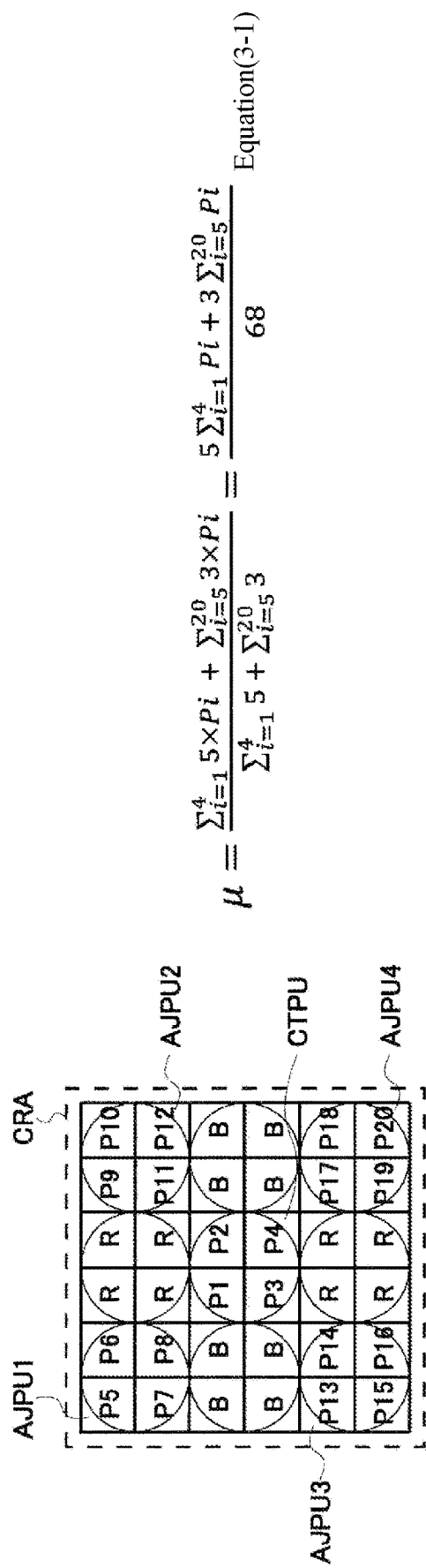
FIG. 11 is a diagram for explaining a first specific example of a processing for obtaining a correction coefficient according to a third embodiment of the present disclosure.

FIG. 11 is a diagram showing a first specific example of obtaining a correction coefficient according to the third embodiment of the present disclosure. In addition, Equation 3-1 shows an example of substituting the first weighting coefficient CTW1 and the second weighting coefficient AJW1 into specific numerical values as the weighting coefficient of the above-mentioned Equation 3.

$$\mu = \frac{\sum_{i=1}^{4} 5 \times Pi + \sum_{i=5}^{20} 3 \times Pi}{\sum_{i=1}^{4} 5 + \sum_{i=5}^{20} 3} = \frac{5\sum_{i=1}^{4} Pi + 3\sum_{i=5}^{20} Pi}{68}$$ [Equation 3-1]

In the first specific example, the pixel unit PU114 is equivalent to the correction target pixel unit CTPU, and uses the pixel unit PU111 on the upper left side, the pixel unit PU121 on the upper right side, the pixel unit PU211 on the lower left side and the pixel unit PU221 on the lower right side that are relative to the correction target pixel unit CTPU as adjacent pixel units AJPU1 to AJPU4.

The correction refers to the read value of each pixel PX (sensitivities P1 to P4 corresponding to the pixel signals) of the correction target pixel unit CTPU, which contains the correction target pixels, and also refers to the read value of each pixel of the adjacent pixel units AJPU1 to AJPU4 (sensitivities P5 to P8, P9 to P12, P13 to P16 and P17 to P20 corresponding to the pixel signals).

Moreover, as shown in Equation 3-1, as for the weighting coefficient W, the first weighting coefficient CTW1 of the pixels of the correction target pixel unit CTPU (PU114) is set to "5," and the second weighting coefficient AJW1 of the pixels adjacent to the pixel units AJPU1 to AJPU4 is set to "3." Such setting values satisfy the above-mentioned condition CTW>AJW. Additionally, "5" of the first weighting coefficient CTW1 is set to correspond to the sensitivities P1 to P4 of the 4 pixels of the correction target pixel unit CTPU, and "3" of the second weighting coefficient AJW1 is set to correspond to the 16 pixels of the adjacent pixel units AJPU1 to AJPU4. As a result, in the example, the sum of the weighting coefficients of the pixel units related to the correction target becomes "68."

As such, in the first specific example, the correction circuit 710 obtains (calculates) the correction coefficient μ used to correct the sensitivity P1 of the correction target pixel at the upper left of the correction target pixel unit CTPU, and obtains the sensitivities P1 to P4 for the four G pixels arranged in the correction target pixel unit CTPU which is the same as the correction target pixel (G pixel) and multiplied by the first weighting coefficient CTW1 (5) such that the first sum of the sensitivities is obtained by weighting. At the same time, the correction circuit 710 obtains the sensitivities P5 to P20 for the sixteen G pixels of the adjacent pixel units AJPU1 to AJPU4 arranged diagonally above the correction target pixel unit CTPU and multiplied by the second weighting coefficient AJW1 (3) such that the second sum of the sensitivities is obtained by weighting. Moreover, the first sum of and the second sum of the weighted sensitivities are added to obtain a weighted total sensitivity, and the weighted total sensitivity is divided by the sum n(=68) of the weighting coefficients of the pixels related to correction to obtain a desired correction coefficient μ.

Accordingly, the pixel array 200 adjacent to the pixel unit containing a plurality of pixels with the same color like G pixels does not use a simple average, but uses not only the correction target pixel unit CTPU, but also the weighted average of the adjacent pixel units AJPUs adjacent to the correction target pixel unit CTPU. For example, it is possible to correct the uneven sensitivity generated by multiple factors under a microlens, thereby achieving the higher-precision image quality.

(Second Specific Example of the Correction Coefficient Acquisition Processing in the Third Embodiment)

Figure 12:
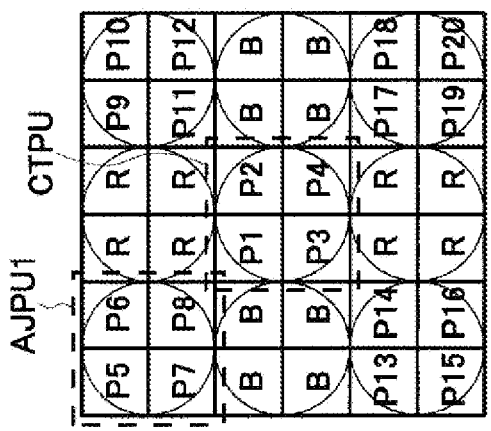
FIG. 12 is a diagram for explaining a second specific example of a processing for obtaining a correction coefficient according to the third embodiment of the present disclosure.

FIG. 12 is a diagram showing a second specific example of obtaining a correction coefficient according to the third embodiment of the present disclosure. Additionally, Equation 3-2 shows an example of substituting the first weighting coefficient CTW1 and the second weighting coefficient AJW1 into specific numerical values as the weighting coefficient of the above-mentioned Equation 3.

$$\mu = \frac{\sum_{i=1}^{4} 3 \times Pi + \sum_{i=5}^{8} 2 \times Pi}{\sum_{i=1}^{4} 3 + \sum_{i=5}^{8} 2} = \frac{3\sum_{i=1}^{4} Pi + 2\sum_{i=5}^{8} Pi}{20} \quad \text{[Equation 3-2]}$$

In the second specific example, the pixel unit PU114 is equivalent to the correction target pixel unit CTPU, and uses the pixel unit PU111 on the upper left side with respect to the correction target pixel unit CTPU as an adjacent pixel unit AJPU1 with the same color. In addition, in the example, 1, 2 or 3 pixel units are selected from the pixel unit PU111 on the upper left side, the pixel unit PU121 on the upper right side, the pixel unit PU211 on the lower left side and the pixel unit PU221 on the lower right side are relative to the pixel unit PU114 to be the correction target, and used as adjacent pixel units AJPU1 to AJPU4.

The correction refers to the read value of each pixel PX (sensitivities P1 to P4 corresponding to the pixel signals) of the correction target pixel unit CTPU, which contains the correction target pixels, and also refers to the read value of each pixel of the adjacent pixel unit AJPU1 (sensitivities P5 to P8 corresponding to the pixel signals).

Moreover, as shown in Equation 3-2, as for the weighting coefficient W, the first weighting coefficient CTW1 of the pixels of the correction target pixel unit CTPU (PU114) is set to "3", and the second weighting coefficient AJW1 of the pixels adjacent to the pixel unit AJPU1 is set to "2." Such setting value satisfies the above-mentioned condition CTW>AJW. Additionally, "3" of the first weighting coefficient CTW1 is set to correspond to the sensitivities P1 to P4 of the 4 pixels of the correction target pixel unit CTPU, and "2" of the second weighting coefficient AJW1 is set to correspond to the 4 pixels of the adjacent pixel unit AJPU1. Besides, in this example, the sum n of the weighting coefficients of the pixels related to the correction target becomes "20."

Hence, in the second specific example, the correction circuit 710 obtains (calculates) the correction coefficient μ used to correct the sensitivity P1 of the correction target pixel at the upper left of the correction target pixel unit CTPU, and obtains the sensitivities P1 to P4 for the four G pixels arranged in the correction target pixel unit CTPU which is the same as the correction target pixel (G pixel) and multiplied by the first weighting coefficient CTW1 (3) such that the first sum of the sensitivities is obtained by weighting. At the same time, the correction circuit 710 obtains the sensitivities P5 to P8 for the four G pixels of the adjacent pixel unit AJPU1 arranged diagonally above the correction target pixel unit CTPU and multiplied by the second weighting coefficient AJW1 (2) such that the second sum of the sensitivities is obtained by weighting. Moreover, the first sum and the second sum of the weighted sensitivities are added to obtain a weighted total sensitivity, and the weighted total sensitivity is divided by the sum n(=20) of the weighting coefficients of the pixels related to correction to obtain a desired correction coefficient μ.

As such, the pixel array 200 adjacent to the pixel unit containing a plurality of pixels with the same color like G pixels does not use a simple average, but uses not only the correction target pixel unit CTPU, but also the weighted average of the adjacent pixel units AJPUs adjacent to the correction target pixel unit CTPU. For example, it is possible to correct the uneven sensitivity generated by multiple factors under a microlens, thereby achieving the higher-precision image quality.

(Third Specific Example of the Correction Coefficient Acquisition Processing in the Third Embodiment)

Figure 13:
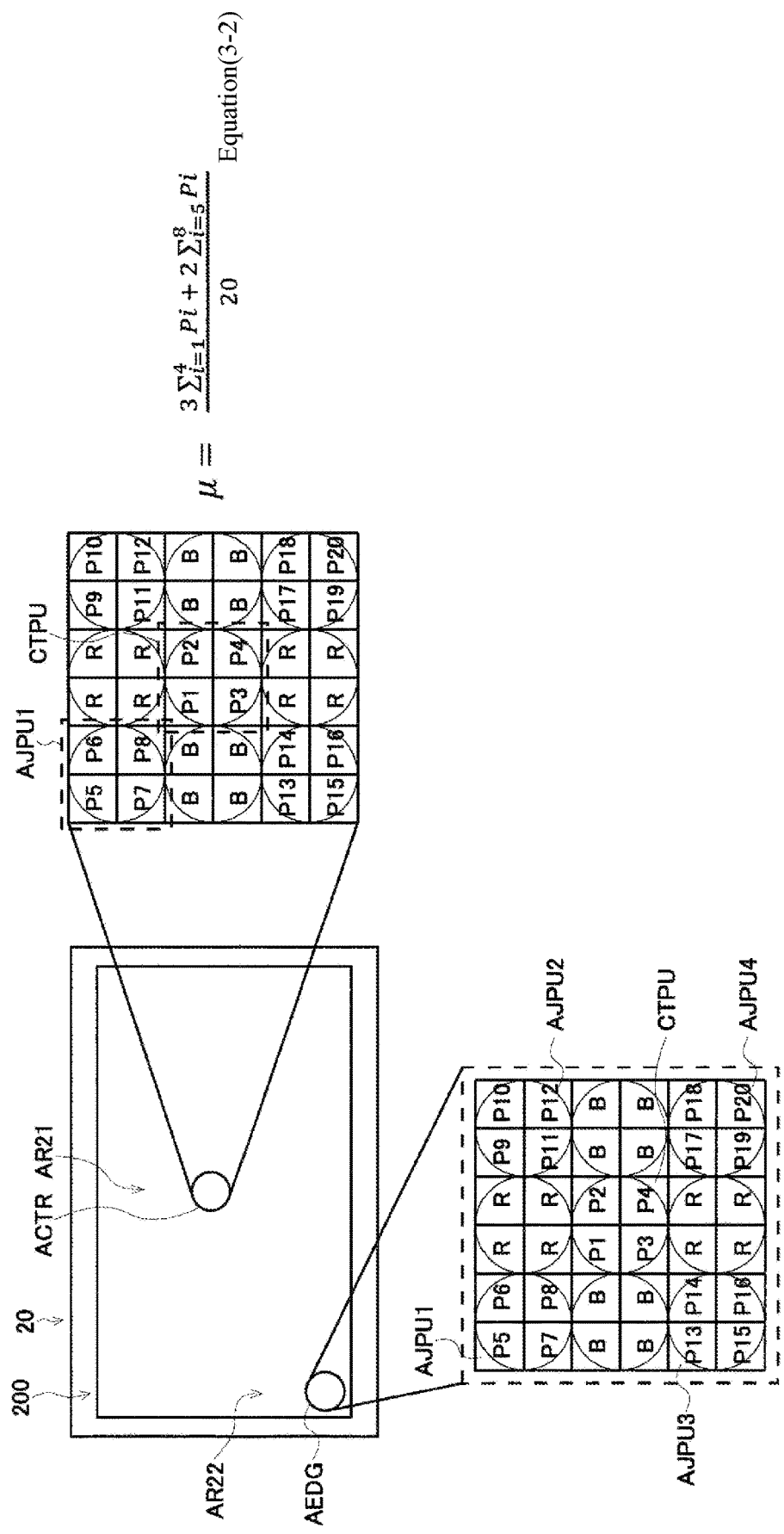
FIG. 13 is a diagram for explaining a third specific example of a processing for obtaining a correction coefficient according to the third embodiment of the present disclosure.

FIG. 13 is a diagram showing a third specific example of obtaining a correction coefficient according to the third embodiment of the present disclosure.

In the third specific example, the correction circuit 710 may use different numbers of adjacent pixel units AJPU for correction according to the arrangement areas of pixels in the pixel portion 20. In the example, the first arrangement area AR21 and the second arrangement area AR22 are adopted as arrangement areas of pixels. The first arrangement area AR21 includes the central area ACTR of the pixel portion 20, and the second arrangement area AR22 includes the peripheral area AEDG of the pixel portion 20.

The correction circuit 710 may use fewer adjacent pixel units AJPUs in the first arrangement area AR1, and then divide a sum of the weighted sensitivities according to Equation 3-2 by the first total number of the weighting coefficients of the pixels related to correction (20 in the example of FIG. 13) to calculate the correction coefficient μ. The correction circuit 710 increases the number of adjacent pixel units AJPUs used in the second arrangement area AR2 to improve accuracy, and then divide a sum of the weighted sensitivities according to Equation 3-1 by the first total number of the weighting coefficients of the pixels related to correction (68 in the example of FIG. 13) to calculate the correction coefficient μ.

According to the correction method, it is easy to change the corrected sampling area or correction coefficient according to arrangement positions of the pixels in the pixel portion 20. For example, in FIG. 13, in the central area ACTR of the pixel portion 20 of the image sensor, the correction coefficient μ for correcting the sensitivity is obtained by Equation 3-2. Besides, for example, Equation 3-1 can also be used in the chip peripheral area AEDG where the incidence of oblique light is more and the influence of shading is greater such that a wider range of adjacent pixels can be corrected.

To sum up, in the first embodiment, the correction circuit 710 weighs a sensitivity Pn corresponding to a pixel signal of each pixel PX related to correction in the PU to be the correction target and a sensitivity Pn corresponding to a pixel signal of each pixel related to correction in at least one same color PU adjacent to the PU to be the correction target by a weighting coefficient Wi. Accordingly, the correction coefficient μ is calculated by dividing a sum of the weighted sensitivities by a total number n of the weighting coefficients of the pixels related to correction.

Therefore, the third embodiment has the advantages of being able to correct uneven sensitivity generated by multiple factors in a broad area and to achieve the higher-precision image quality.

In addition, according to the third embodiment, the correction circuit 710 can use different numbers of adjacent pixel units AJPUs for correction based on the arrangement areas of pixels in the pixel portion 20. Thus, the third embodiment can individually correct uneven sensitivity generated by multiple factors in a broad area with the best correction method, and can achieve the higher-precision image quality, thereby being able to correct uneven sensitivity in a localized area with high accuracy.

Fourth Embodiment

Equation 4 (shown below) is a calculation for obtaining the correction coefficient in the fourth embodiment of the present disclosure.

$$\mu = \frac{\sum_{i=1}^{n} f_{(i)} \times Pi}{n} \quad \text{[Equation 4]}$$

wherein μ is a weighted average,
f(i) is a weighting factor (a function),
Pi is a sensitivity of each pixel, and
n is a total number of pixels related to correction.

The differences between the correction coefficient of the fourth embodiment and the correction coefficients of the first, second and third embodiments are described as follows.

In the correction coefficient acquisition processing of the fourth embodiment, the aforementioned weighting coefficient Wi is generated by a function f(i). In the fourth embodiment, the function f(i) includes a function showing a theoretical value based on the microlens shading.

Here, a specific example of the correction coefficient acquisition processing in the fourth embodiment is described as follows.
(Specific Example of the Correction Coefficient Acquisition Processing in the Fourth Embodiment)

Figure 14A:
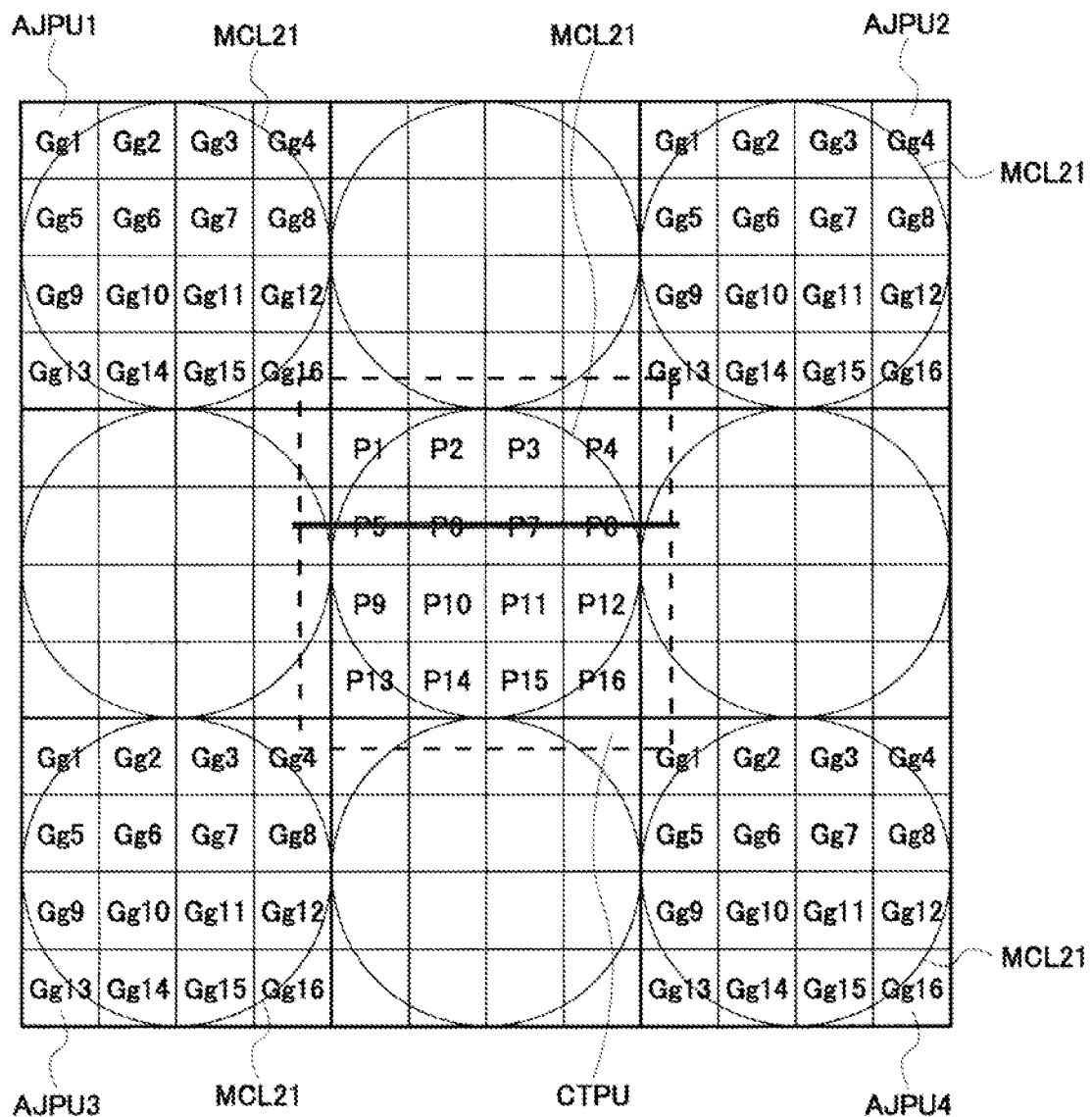
FIG. 14A to FIG. 14C are diagrams for explaining a processing for obtaining correction coefficients according to a fourth embodiment of the present disclosure.
Figure 14B:
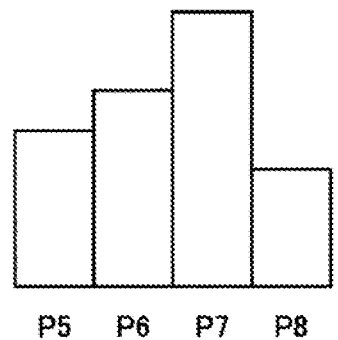
Figure 14C:
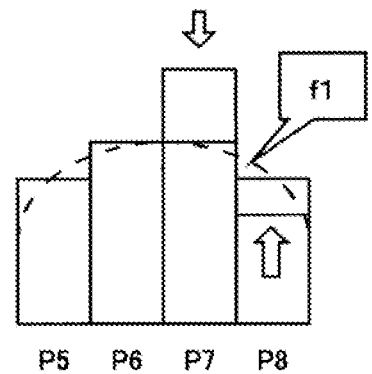

Specifically, FIG. 14A shows a pixel unit arrangement of a pixel group, FIG. 14B shows a brightness value distribution of a correction target pixel unit CTPU on a line x-x of FIG. 14A, and FIG. 14C is a schematic diagram showing a situation of correcting shading in a way related to the function f(i).

In the fourth embodiment, each pixel unit PU is composed of 16 pixels with the same color (G) of 4×4. Besides, each microlens MCL 21 is configured to correspond to the correction target pixel unit CTPU and the four 16 pixels G1 to G16 of the adjacent pixel units AJPU1 to AJPU 4 to have a PDAF function.

In the fourth embodiment, the function f(i) corrects the shading generated by the microlens MCL21 of the pixels G1 to G16 relative to the correction target pixel unit CTPU. In addition, the function f(i) is used as a standby function. In the example, the sensitivities of the adjacent pixel units AJPU1 to AJPU4 are also used, and the distance from each of the correction target pixels is also added, that is, the coefficient corresponds to the degree of influence. Besides, in the example, the total number n of pixels that are the correction targets becomes "16."

According to the fourth embodiment, it is also possible to more accurately correct the poor sensitivity generated by the unevenness of the shape of the microlens MCL 21 itself. As a result, the fourth embodiment can correct various uneven sensitivities by using the function as a standby function.

Fifth Embodiment

Equation 5 (shown below) is a calculation for obtaining the correction coefficient in the correction coefficient acquisition processing of the fifth embodiment of the present disclosure.

$$\mu = \frac{\sum_{i=1}^{n} f_{(i)} \times w_{(i)} \times Pi}{n} \quad \text{[Equation 5]}$$

wherein μ is a correction coefficient,
w(i) is a weighting factor (a constant),
Pi is a sensitivity of each pixel,
n is a total number of pixels related to correction, and
f(i) is a weighting factor (a function).

The differences between the correction coefficient of the fifth embodiment and the correction coefficients of the fourth embodiment are described as follows.

In the correction coefficient acquisition processing of the fifth embodiment, when the weighted sensitivity is obtained by the weighting of the weighting coefficient, the correction coefficient μ is obtained by a weighted average after being associated with the function of the theoretical value of the state that meets the pixel arrangement conditions. That is, in the fifth embodiment, the so-called function of the theoretical value that meets the pixel arrangement conditions is equivalent to the function f(i) that shows the theoretical value of the shading based on the aforementioned microlens MCL21, and the function f(i) is multiplied by the correction coefficient determined by the distance from the correction target pixel such that the shading generated by the microlens MCL21 is corrected.

Here, a specific example of the correction coefficient acquisition processing in the fifth embodiment is described as follows.
(Specific Example of the Correction Coefficient Acquisition Processing in the Fifth Embodiment)

Figure 15A:
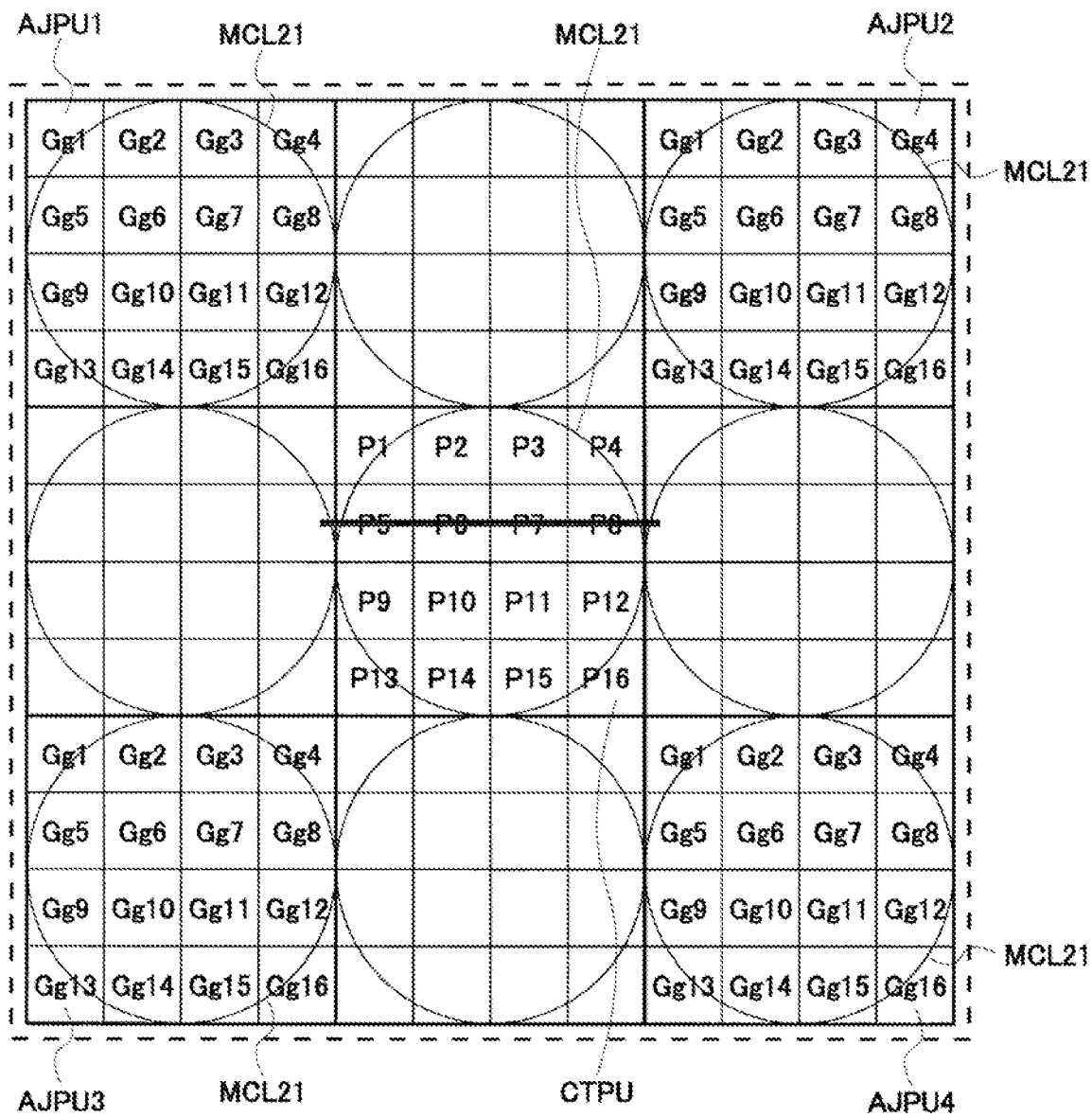
FIG. 15A to FIG. 15C are diagrams for explaining a processing for obtaining correction coefficients according to a fifth embodiment of the present disclosure.
Figure 15B:
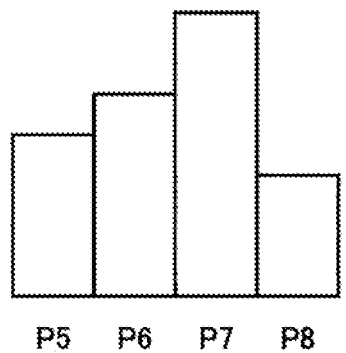
Figure 15C:
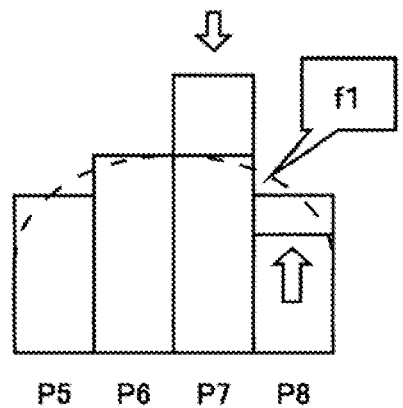

FIG. 15A to FIG. 15C are diagrams showing the correction coefficient acquisition processing according to the fifth embodiment of the present disclosure. Specifically, FIG. 15A shows a pixel unit arrangement of a pixel group, FIG. 15B shows a brightness value distribution of a correction target pixel unit CTPU on a line x-x of FIG. 15A, and FIG. 15C is a schematic diagram showing a situation of correcting shading in a way related to the function f(i).

In the fifth embodiment, similar to the fourth embodiment, each pixel unit PU is composed of 16 pixels with the same color (G) of 4×4. Besides, each microlens MCL 21 is configured to correspond to the correction target pixel unit CTPU and the four 16 pixels G1 to G16 of the adjacent pixel units AJPU1 to AJPU 4 to have a PDAF function.

In the fifth embodiment, a microlens MCL 21 is configured to correspond to the correction target pixel unit CTPU, and four microlens MCL21 are also configured to correspond the four 16 pixels G1 to G16 of the adjacent pixel units AJPU1 to AJPU 4, respectively. If the uneven sensitivity of each pixel is required to be corrected, the fifth embodiment not only obtains an average of the sensitivities of 16 pixels in the same 4×4 pixel units, but also corrects the shading generated by the microlens to obtain a weighted average, thereby more accurately correcting the uneven sensitivity of each pixel. In the example, the sensitivities of the adjacent pixel units AJPU 1 to AJPU4 are also used, and the distance from each of the correction target pixels is also added, that is, the coefficient corresponds to the degree of influence. Besides, in the example, the total number n of pixels that are the correction targets becomes "80."

According to the fifth embodiment, it is also possible to more accurately correct the poor sensitivity generated by the unevenness of the shape of the microlens MCL 21 itself. As a result, the fifth embodiment can correct various uneven sensitivities by using the function as a standby function.

Sixth Embodiment

Figure 16A:
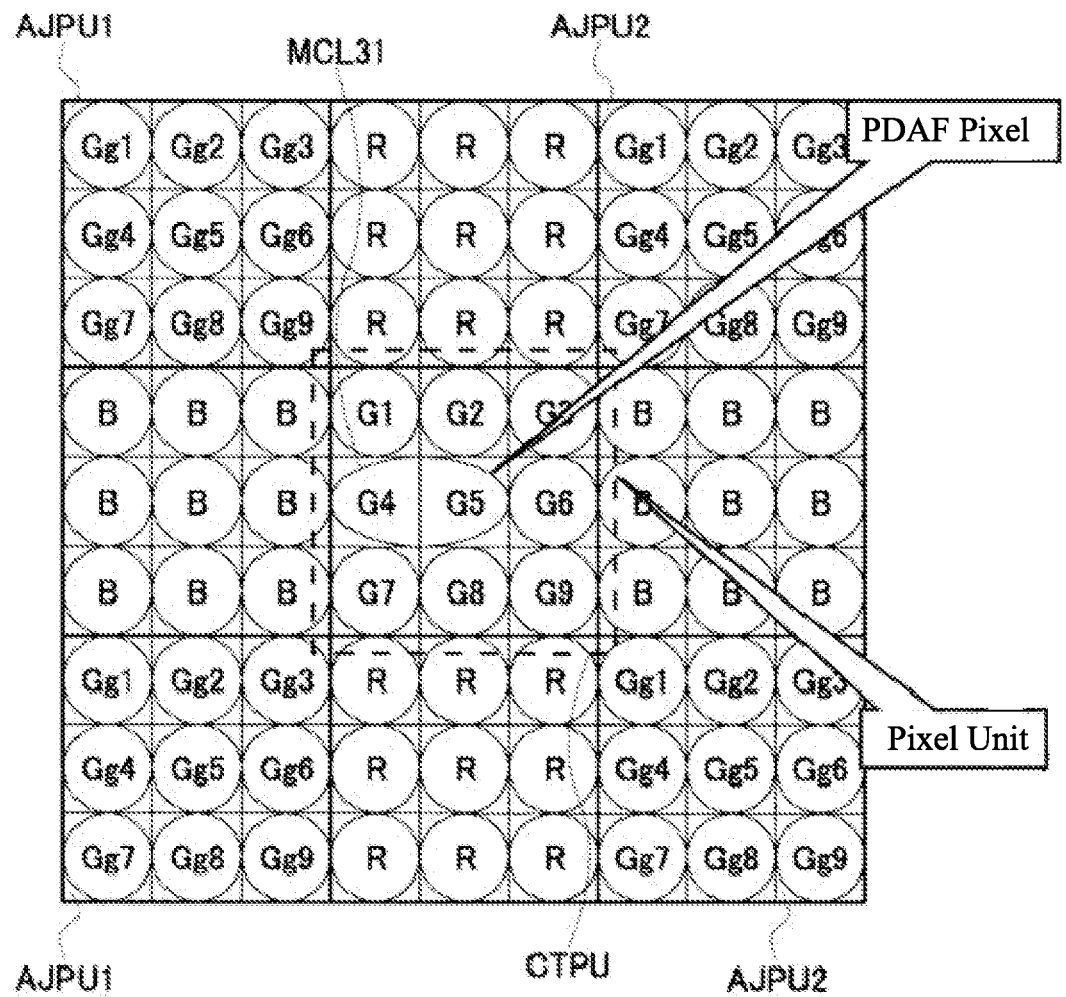
FIG. 16A and FIG. 16B are diagrams for explaining a processing for obtaining correction coefficients according to a sixth embodiment of the present disclosure.
Figure 16B:
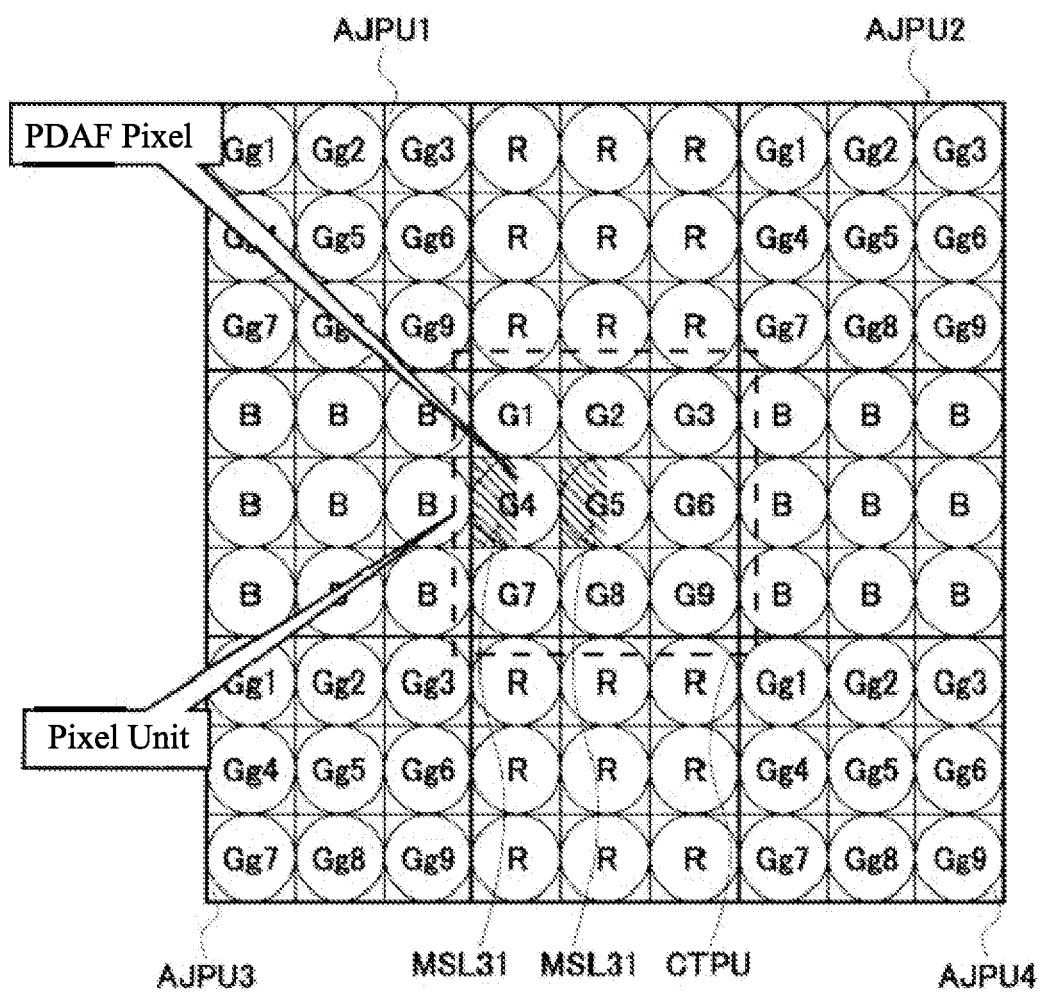

FIG. 16A and FIG. 16B are diagrams showing the correction coefficient acquisition processing according to the sixth embodiment of the present disclosure.

The differences between the sixth embodiment and the first embodiment are described as follows.

In the first embodiment, each pixel unit PU is composed of 4 pixels (G) with the same color of 2×2, a microlens MCL is configured to correspond to all 4 pixels of each pixel unit PU.

In contrast, in the sixth embodiment, as shown in FIG. 16A, each pixel unit PU is composed of 9 pixels with the same color (G) of 3×3, and a microlens MCL31 is configured to correspond to the 2 pixels G4 and G5 of the correction target pixel unit CTPU to have a PDAF function. Alternatively, as shown in FIG. 16B, each pixel unit PU is composed of 9 pixels with the same color (G) of 3×3, and a metal shield MSL31 is configured to correspond to the 2 pixels G4 and G5 of the correction target pixel unit CTPU to have a PDAF function. Since the sixth embodiment can include locality in the sensitivities of pixels with the PDAF function in a pixel unit, the sensitivities of the correction target pixel unit CTPU can be corrected based on a function of a weighted average of the pixels of the correction target pixel unit CTPU or the pixels of the adjacent pixel units AJPU with the same color or weighted sensitivities of surrounding pixels of the correction target pixel unit CTPU.

Seventh Embodiment

Figure 17:
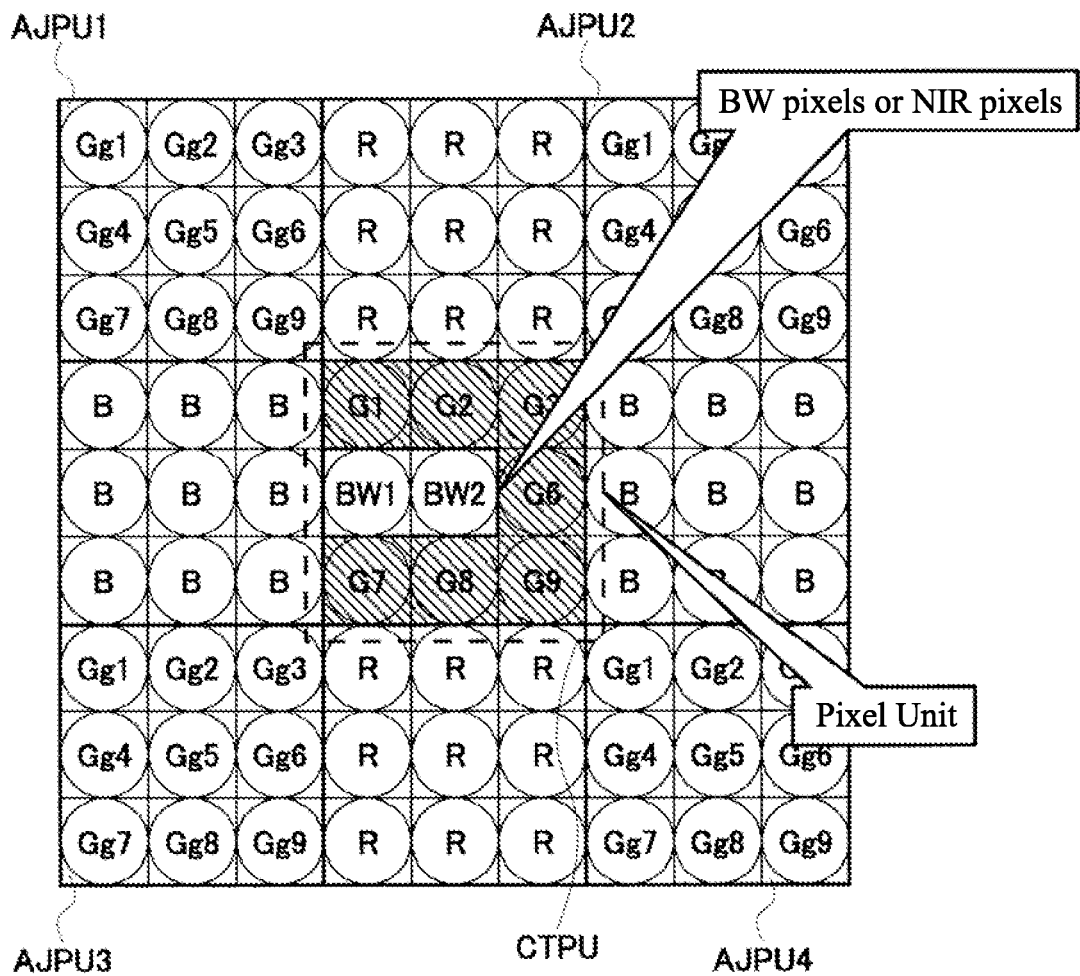
FIG. 17 is a diagram for explaining a processing for obtaining correction coefficients according to a seventh embodiment of the present disclosure.

FIG. 17 is a diagram showing the correction coefficient acquisition processing according to the seventh embodiment of the present disclosure.

The differences between the seventh embodiment and the first embodiment are described as follows. In the first embodiment, each pixel unit PU is composed of 4 pixels (G) with the same color of 2×2, a microlens MCL is configured to correspond to all 4 pixels of each pixel unit PU.

In contrast, in the seventh embodiment, as shown in FIG. 17, each pixel unit PU is composed of 9 pixels with the same color (G) of 3×3, and a black and white pixel or a near infrared (NIR) pixel is configured to correspond to each of the 2 pixels G4 and G5 of the correction target pixel unit CTPU. Consequently, the pixel unit of the correction target pixel unit CTPU contains different colors.

Since the seventh embodiment can include locality in the sensitivities of black and white pixels or NIR pixels in a pixel unit, the sensitivities of the correction target pixel unit CTPU can be corrected based on a function of a weighted average of the pixels of the correction target pixel unit CTPU or the pixels of the adjacent pixel units AJPU with the same color or weighted sensitivities of surrounding pixels of the correction target pixel unit CTPU.

Eighth Embodiment

Equation 6 (shown below) is a calculation for obtaining the correction coefficient in the correction coefficient acquisition processing of the eighth embodiment of the present disclosure.

$$\mu_{i/2} = \begin{matrix} x_{i/2} & n - \text{odd number} \\ \dfrac{x_{i/2-1} + x_{i/2}}{2} & n - \text{even number} \end{matrix}$$ [Equation 6]

wherein $\mu_{i/2}$ is a middle value, and x is a sensitivity of each pixel.

Figure 18:
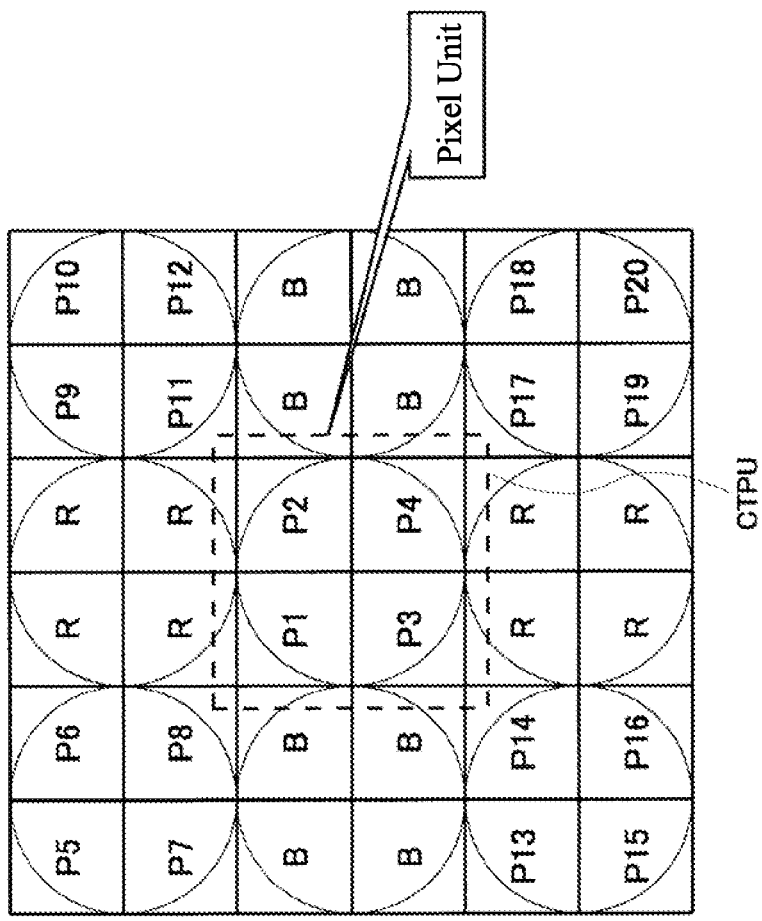
FIG. 18 is a diagram for explaining a processing for obtaining correction coefficients according to an eighth embodiment of the present disclosure.

FIG. 18 is a diagram showing that a correction coefficient is obtained according to an eighth embodiment of the present disclosure.

The differences between the eighth embodiment and the first, second, third, fourth, fifth, sixth and seventh embodiments are described as follows. In the eighth embodiment, the correction coefficient acquisition processing is to obtain a middle value of the same pixel unit or other adjacent pixel units as a correction coefficient for the sensitivities of the pixels, instead of the weighted average.

The eight embodiment can correct the uneven sensitivities in a broad area that is difficult to correct in the prior art by using a middle value of adjacent pixels with the same color.

Ninth Embodiment

Equation 7 (shown below) is a calculation for obtaining the correction coefficient in the correction coefficient acquisition processing of the ninth embodiment of the present disclosure.

$$M_o = l + \dfrac{f_{+1}}{f_{-1} + f_{+1}} \times h$$ [Equation 7]

wherein Mo is a mode value, l is a lower point of a class containing the mode value Mo, $f_{+1}$ is the number of degrees between the following classes, $f_{-1}$ is the number of degrees between the preceding classes, and h is a width between classes.

In Equation 7, Mo represent a mode value, l represents a lower point of a class containing the mode value Mo, $f_{+1}$ represents the number of degrees between the following classes, $f_{-1}$ represents the number of degrees between the preceding classes, and h represents a width between classes.

Figure 19:
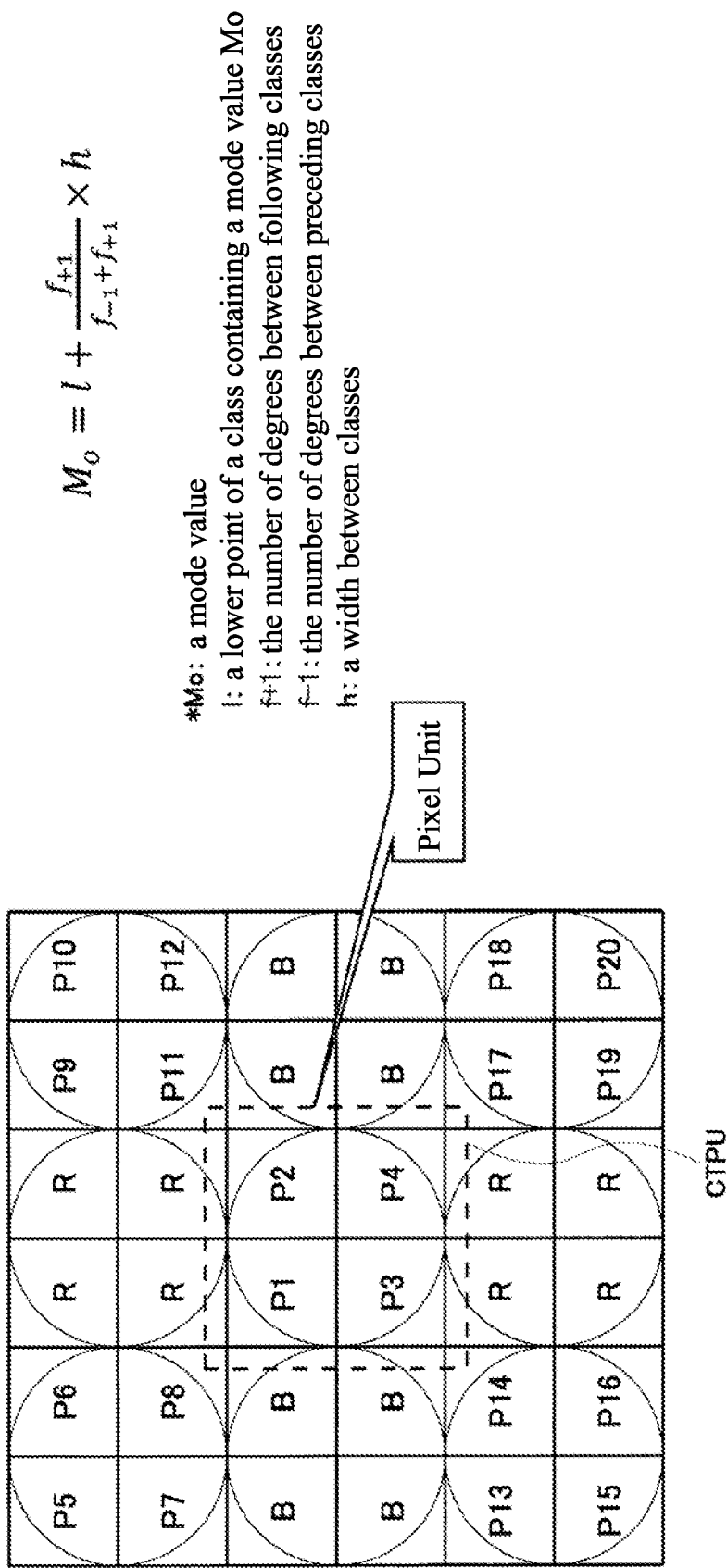
FIG. 19 a diagram for explaining a processing for obtaining correction coefficients according to a ninth embodiment of the present disclosure.

FIG. 19 a diagram showing that a correction coefficient is obtained according to a ninth embodiment of the present disclosure.

The differences between the ninth embodiment and the first, second, third, fourth, fifth, sixth and seventh embodiments are described as follows. In the ninth embodiment, the correction coefficient acquisition processing is to obtain a mode value of the same pixel unit or other adjacent pixel units as a correction coefficient for the sensitivities of the pixels, instead of the weighted average.

The ninth embodiment can correct the uneven sensitivities in a broad area that is difficult to correct in the prior art by using a middle value of adjacent pixels with the same color.

The solid-state imaging apparatus 10 described above can be used as a camera apparatus that is applied to electronic devices such as digital cameras, camcorders, mobile terminal apparatus, surveillance cameras and medical endoscope cameras.

Figure 20:
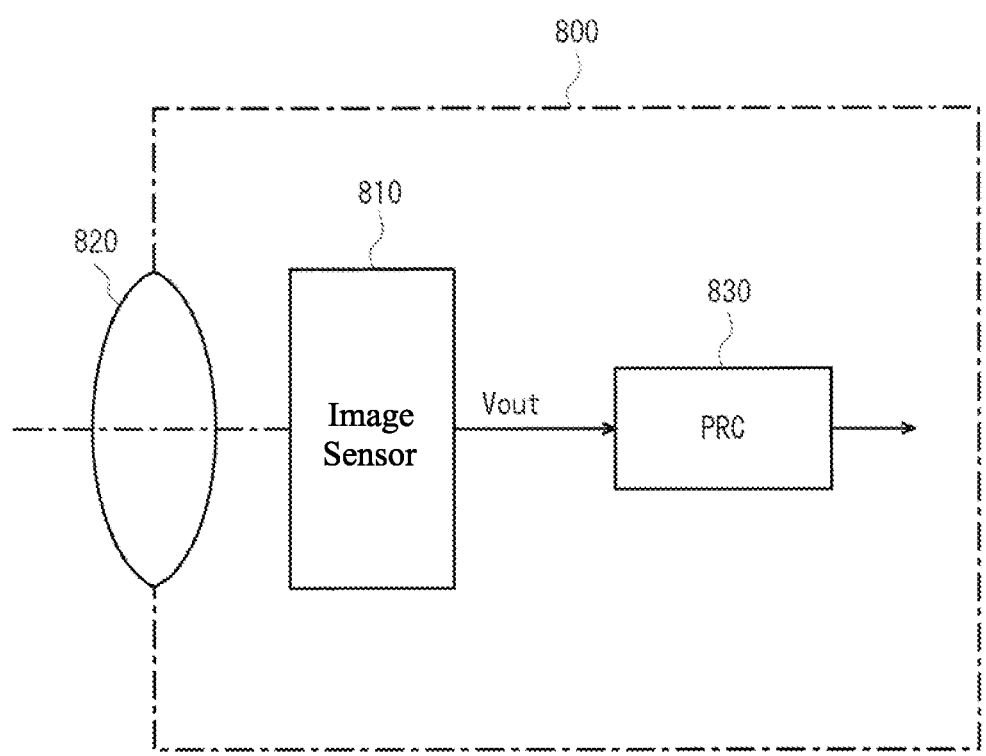
FIG. 20 is a diagram showing a structure example of an electronic device to which the solid-state imaging apparatus is applied according to the present disclosure.

FIG. 20 is a diagram showing a structure example of an electronic device to which the solid-state imaging apparatus is applied according to the present disclosure.

As shown in FIG. 20, the electronic device 800 has a CMOS image sensor 810 to which the solid-state imaging apparatus 10 of the present disclosure can be applied. In addition, the electronic device 800 has an optical system (a lens, etc.) 820 that guides incident light to the pixel area of the CMOS image sensor 810 (imaging of an image). The electronic device 800 has a signal processing circuit (PRC) 830 for processing the output signal of the CMOS image sensor 810.

The signal processing circuit 830 performs predetermined signal processing on the output signal of the CMOS image sensor 810. The image signals processed by the signal processing circuit 830 are displayed as animations on a monitor composed of a liquid crystal display, etc. Additionally, the image signals can also be directly recorded in various recording media such as a memory card.

In summary, the present disclosure can provide a high-performance, small-sized and low-cost camera system by mounting the aforementioned solid-state imaging apparatus 10 as the CMOS image sensor 810. Besides, the present disclosure can realize electronic device such as surveillance cameras, medical endoscope cameras, etc., which are used in applications where the installation requirements of the camera have restrictions on the installation size, the number of cables that can be connected, the cable length and the installation height.

What is claimed is:

1. A solid-state imaging apparatus, comprising:
a pixel portion having a plurality of pixel units in which each of the pixel units includes a plurality of pixels of same color for performing photoelectric conversion; and
a correction circuit that corrects a pixel sensitivity of the pixel unit to be a correction target with reference to an obtained correction coefficient,
wherein the correction circuit weighs a sensitivity value corresponding to a pixel signal of each of the pixels related to the correction in the pixel unit to be the correction target and the sensitivity value corresponding to a pixel signal of each of the pixels related to the correction in at least one of the pixel units adjacent to the pixel unit to be the correction target by weighting coefficients, and then obtains a weighted average of weighted sensitivities so as to obtain the correction coefficient.

2. The solid-state imaging apparatus according to claim 1, wherein the correction circuit weighs the sensitivity value corresponding to a pixel signal of each of the pixels related to correction in the pixel unit to be the correction target and the sensitivity value corresponding to a pixel signal of each of the pixels related to correction in at least one of same color of the pixel units adjacent to the pixel unit to be the correction target by the weighting coefficients to calculate the correction coefficient by dividing a sum of the weighted sensitivity values by a total number of the pixels related to the correction.

3. The solid-state imaging apparatus according to claim 2, wherein the correction circuit employs different numbers of the adjacent ones of the pixel units according to arrangement areas of pixels in the pixel portion.

4. The solid-state imaging apparatus according to claim 3, wherein the correction circuit calculates the correction coefficient by dividing the sum of the weighted sensitivity values by a first total number of the pixels related to correction in a first arrangement area with fewer employed adjacent ones of the pixel units, and the correction circuit calculates the correction coefficient by dividing the sum of the weighted sensitivity values by a second total number of the pixels related to the correction in a second arrangement area with more employed adjacent ones of the pixel units.

5. The solid-state imaging apparatus according to claim 2, wherein the pixel unit to be the correction target is divided into a plurality of areas, and one of the areas includes the pixels that are the correction target, and
the correction circuit obtains the sum of the weighted sensitivity values in each of the areas based on the weighting coefficients set for the plurality of divided areas, and obtains the correction coefficient by dividing a total of the weighted sensitivity values including a sum of the weighted sensitivity values of the adjacent ones of the pixel units by the total number of the pixels related to the correction.

6. The solid-state imaging apparatus according to claim 1, wherein the correction circuit weighs a sensitivity value corresponding to a pixel signal of each of the pixels related to correction in the pixel unit to be the correction target and a sensitivity value corresponding to a pixel signal of each of the pixels related to the correction in at least one of same color of the pixel units adjacent to the pixel unit to be the correction target by the weighting coefficients to calculate the correction coefficient by dividing a sum of the weighted sensitivity values by a sum of the weighting coefficients of the pixel units related to the correction.

7. The solid-state imaging apparatus according to claim 6, wherein the correction circuit employs different numbers of the adjacent ones of the pixel units according to arrangement areas of pixels in the pixel portion.

8. The solid-state imaging apparatus according to claim 7, wherein the correction circuit calculates the correction coefficient by dividing the sum of the weighted sensitivity values by a first sum of weighting coefficients of the pixel units related to the correction in a first arrangement area with fewer employed adjacent ones of the pixel units, and
the correction circuit calculates the correction coefficient by dividing the sum of the weighted sensitivity values by a second sum of weighting coefficients of the pixel units related to the correction in a second arrangement area with more employed adjacent ones of the pixel units.

9. The solid-state imaging apparatus according to claim 4, wherein the first arrangement area includes a central area of the pixel portion, and the second arrangement area includes a peripheral area of the pixel portion.

10. The solid-state imaging apparatus according to claim 1, wherein the weighting coefficients include constants.

11. The solid-state imaging apparatus according to claim 1, wherein the weighting coefficients include functions that meet pixel arrangement conditions.

12. The solid-state imaging apparatus according to claim 10, wherein when the correction circuit weighs the sensitivity values by the weighting coefficients to obtain the weighted sensitivity values, the correction circuit obtains the correction coefficient as the weighted average with reference to a function of a theoretical value of a state that meets a pixel arrangement condition.

13. The solid-state imaging apparatus according to claim 11, wherein one microlens is formed for a plurality of pixels of the pixel units, and
the function is one showing a theoretical value of lens shading.

14. The solid-state imaging apparatus according to claim 1, wherein the weighting coefficients includes a first weighting coefficient set for the pixels of the pixel unit to be the correction target and a second weighting coefficient set for the pixels of the other ones of the pixel units, and the first weighting coefficient is greater than the second weighting coefficient.

15. The solid-state imaging apparatus according to claim 1, wherein the first weighting coefficient used in a target area and configured with the pixels that are the correction target is set to a maximum value, and the second weighting coefficient used in other arrangement areas of the pixels is set to a value that meets arrangement conditions employed in the target area.

16. The solid-state imaging apparatus according to claim 1, wherein the correction circuit obtains a middle value of the sensitivities or color difference signals of the pixels of a same pixel unit or the adjacent pixel units as the correction coefficient to replace the weighted average.

17. The solid-state imaging apparatus according to claim 1, wherein the correction circuit obtains a mode value of the sensitivity values or color difference signals of the pixels of a same one or an adjacent one of the pixel units as the correction coefficient to replace the weighted average.

18. A signal processing method of a solid-state imaging apparatus, the solid-state imaging apparatus comprising:
a pixel portion having a plurality of pixel units in which each of the pixel units includes a plurality of pixels of same color for performing photoelectric conversion; and
a correction circuit that corrects a pixel sensitivity of the pixel units to be a correction target with reference to an obtained correction coefficient,
wherein the correction circuit weighs a sensitivity value corresponding to a pixel signal of each of the pixels related to the correction in the pixel unit to be the correction target and a sensitivity value corresponding to a pixel signal of each of the pixels related to the correction in at least one of the pixel units adjacent to the pixel unit to be the correction target by weighting coefficients, and
obtains a weighted average of weighted sensitivity values so as to obtain the correction coefficient.

19. An electronic device, comprising:
a solid-state imaging apparatus; and
an optical system, configured for imaging an object in the solid-state imaging apparatus,
wherein the solid-state imaging apparatus comprises:
a pixel portion having a plurality of pixel units in which each of the pixel units includes a plurality of pixels of same color for performing photoelectric conversion; and
a correction circuit that corrects a pixel sensitivity of the pixel units to be a correction target with reference to an obtained correction coefficient,
wherein the correction circuit weighs a sensitivity value corresponding to a pixel signal of each of the pixels related to the correction in the pixel unit to be the correction target and a sensitivity value corresponding to a pixel signal of each of the pixels related to the correction in at least one of the pixel units adjacent to the pixel unit to be the correction target by weighting coefficients, and then obtains a weighted average of weighted sensitivities so as to obtain the correction coefficient.

* * * * *